(12) United States Patent
Chow et al.

(10) Patent No.: US 7,664,902 B1
(45) Date of Patent: Feb. 16, 2010

(54) EXTENDED SD AND MICROSD HOSTS AND DEVICES WITH USB-LIKE HIGH PERFORMANCE PACKETIZED INTERFACE AND PROTOCOL

(75) Inventors: David Q. Chow, San Jose, CA (US); Charles C. Lee, Cupertino, CA (US); Frank I-Kang Yu, Palo Alto, CA (US); Abraham C. Ma, Fremont, CA (US); Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 227 days.

(21) Appl. No.: 11/925,349

(22) Filed: Oct. 26, 2007

Related U.S. Application Data

(63) Continuation-in-part of application No. 11/624,667, filed on Jan. 18, 2007, and a continuation-in-part of application No. 10/854,004, filed on May 25, 2004, which is a continuation-in-part of application No. 10/708,634, filed on Mar. 16, 2004, now Pat. No. 7,069,369, application No. 11/925,349, which is a continuation-in-part of application No. 11/864,696, filed on Sep. 28, 2007, and a continuation-in-part of application No. 10/917,576, filed on Aug. 13, 2004.

(51) Int. Cl.
*H05K 7/10* (2006.01)
(52) U.S. Cl. .......................... 710/301; 710/16; 710/59; 710/302; 710/303; 713/192
(58) Field of Classification Search ............ 710/10, 710/16, 59, 301, 302, 303; 713/192
See application file for complete search history.

(56) References Cited

U.S. PATENT DOCUMENTS 4,817,037 A * 3/1989 Hoffman et al. ............ 710/110

(Continued)

OTHER PUBLICATIONS

USB Application Team. AN1071 Application Note. Half Duplex USB-to-Serial Bridge Using the ST72611 USB Microcontroller. 2002.*

(Continued)

*Primary Examiner*—Mark Rinehart
*Assistant Examiner*—Matthew D Spittle
(74) *Attorney, Agent, or Firm*—Blakely Sokoloff Taylor & Zafman LLP

(57) ABSTRACT

An extended Secure-Digital (SD) card has a second interface that uses some of the SD-interface lines. A card-detection routine on a host can initially use the SD interface to detect extended capabilities and command the card to switch to using the second interface. The extended SD card can communicate with legacy SD hosts using just the SD interface, or extended SD cards using the second interface. Also an extended Universal-Serial Bus (EUSB) host enters a suspend mode rather than polling an EUSB device that is busy performing a memory or other operations. Power is saved since polling is avoided. The busy EUSB device sends a not-yet signal back to the EUSB host to instruct the host to enter the suspend mode. When the EUSB device is ready to continue transfer with the host, the EUSB device wakes up the host by sending a ready signal back to the host.

10 Claims, 35 Drawing Sheets

U.S. PATENT DOCUMENTS

| | | | |
|---|---|---|---|
| 4,930,914 A * | 6/1990 | Hulterstrum et al. ...... 400/109.1 |
| 5,038,320 A * | 8/1991 | Heath et al. .................... 710/10 |
| 5,088,091 A * | 2/1992 | Schroeder et al. ........... 370/406 |
| 5,265,243 A * | 11/1993 | Povenmire et al. ............. 710/62 |
| 5,394,527 A * | 2/1995 | Fakhruddin et al. ............ 710/59 |
| 5,557,662 A * | 9/1996 | Kenmochi et al. ...... 379/100.01 |
| 5,623,552 A | 4/1997 | Lane |
| 5,671,368 A * | 9/1997 | Chan et al. .................. 710/301 |
| 5,907,856 A | 5/1999 | Estakhri et al. |
| 5,959,541 A | 9/1999 | DiMaria et al. |
| 6,000,006 A | 12/1999 | Bruce et al. |
| 6,012,636 A | 1/2000 | Smith |
| 6,069,920 A | 5/2000 | Schulz et al. |
| 6,081,858 A | 6/2000 | Abudayyeh et al. |
| 6,125,192 A | 9/2000 | Bjorn et al. |
| 6,193,152 B1 | 2/2001 | Fernando et al. |
| 6,202,138 B1 | 3/2001 | Estakhri et al. |
| 6,230,229 B1 * | 5/2001 | Van Krevelen et al. ...... 710/317 |
| 6,230,233 B1 | 5/2001 | Lofgren et al. |
| 6,253,259 B1 * | 6/2001 | Hirabayashi et al. ............ 710/5 |
| 6,275,894 B1 | 8/2001 | Kuo et al. |
| 6,321,478 B1 | 11/2001 | Klebes |
| 6,547,130 B1 | 4/2003 | Shen |
| 6,636,929 B1 | 10/2003 | Frantz et al. |
| 6,662,330 B1 * | 12/2003 | Hershey ..................... 714/748 |
| 6,718,407 B2 | 4/2004 | Martwick |
| 6,725,291 B2 * | 4/2004 | Lai et al. ....................... 710/16 |
| 6,880,024 B2 | 4/2005 | Chen et al. |
| 7,051,128 B2 * | 5/2006 | Bando ........................ 710/100 |
| 7,069,369 B2 * | 6/2006 | Chou et al. .................. 710/301 |
| 7,103,765 B2 | 9/2006 | Chen |
| 7,249,978 B1 | 7/2007 | Ni |
| 7,257,714 B1 | 8/2007 | Shen |
| 7,277,973 B2 * | 10/2007 | Bando ........................ 710/305 |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2004/0148482 A1 | 7/2004 | Grundy et al. |
| 2004/0255054 A1 | 12/2004 | Pua et al. |
| 2005/0102444 A1 | 5/2005 | Cruz |
| 2005/0120146 A1 | 6/2005 | Chen et al. |
| 2005/0160213 A1 | 7/2005 | Chen |
| 2005/0193161 A1 | 9/2005 | Lee et al. |
| 2005/0246243 A1 | 11/2005 | Adams et al. |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2007/0094489 A1 | 4/2007 | Ota et al. |
| 2007/0113067 A1 | 5/2007 | Oh et al. |
| 2007/0113267 A1 | 5/2007 | Iwanski et al. |
| 2007/0130436 A1 | 6/2007 | Shen |

OTHER PUBLICATIONS

ATP. ATP Z-U130 eUSB SSD Specification. Revision 1.2. Feb. 18, 2009.*

Cactus Technologies. CTAN009: An Introduction to SD Card Interface. Application Note. Jun. 3, 2008.*

* cited by examiner

| PIN | DIRECTION | MMC | SD | MUSB | MPCIE/EUSB | eSATA |
|---|---|---|---|---|---|---|
| 1 | I/O | | DAT3 | RSV | PeTn | T- |
| 2 | I/O | CMD | CMD | CD | PeTp | T+ |
| 3 | | VSS1 | VSS1 | VSS1 | VSS1 | VSS1 |
| 4 | | VDD | VDD | VDD | VDD | VDD |
| 5 | I | CLK | CLK | CLK | CLK | CLK |
| 6 | | VSS2 | VSS2 | VSS2 | VSS2 | VSS2 |
| 7 | I/O | DAT0 | DAT0 | DAT0 | DATA0 | DAT0 |
| 8 | I/O | | DAT1 | D+ | PeRp | R- |
| 9 | I/O | | DAT2 | D- | PeRn | R+ |

FIG. 10

| PIN | DIRECTION | MMC | SD | MUSB | MPCIe/EUSB | eSATA |
|---|---|---|---|---|---|---|
| 1 | I/O | | | D- | PeTn | T- |
| 2 | I/O | CMD | CMD | CMD/D+ | CMD/PeTp | CMD/T+ |
| 3 | | VSS1 | VSS1 | VSS1 | VSS1 | VSS1 |
| 4 | | VDD | VDD | VDD | VDD | VDD |
| 5 | I | CLK | CLK | CLK | CLK/PeRn | CLK/R- |
| 6 | | VSS2 | VSS2 | VSS2 | VSS2 | VSS2 |
| 7 | I/O | DAT0 | DAT0 | DAT0 | DAT0/PeRp | DAT0/R+ |

FIG. 11

| PIN | DIRECTION | MMC | SD | MUSB | MPCIe/EUSB | eSATA |
|---|---|---|---|---|---|---|
| 1 | I/O | DAT3 | DAT3 | RSV | PeTn | T- |
| 2 | I/O | CMD | CMD | CMD | CMD/PeTp | CMD/T+ |
| 3 | | VSS1 | VSS1 | VSS1 | VSS1 | VSS1 |
| 4 | | VDD | VDD | VDD | VDD | VDD |
| 5 | I | CLK | CLK | CLK | CLK | CLK |
| 6 | | VSS2 | VSS2 | VSS2 | VSS2 | VSS2 |
| 7 | I/O | DAT0 | DAT0 | DAT0 | DAT0 | DAT0 |
| 8 | I/O | DAT1 | DAT1 | D+ | PeRp | R+ |
| 9 | I/O | DAT2 | DAT2 | D- | PeRn | R- |
| 10 | I/O | DAT4 | DAT4 | RSV | RSV | RSV |
| 11 | I/O | DAT5 | DAT5 | RSV | RSV | RSV |
| 12 | I/O | DAT6 | DAT6 | RSV | RSV | RSV |
| 13 | I/O | DAT7 | DAT7 | RSV | RSV | RSV |

FIG. 12A

| PIN | DIRECTION | MEMORY STICK | MS PRO DUO | MUSB | MPCIe/EUSB | eSATA |
|---|---|---|---|---|---|---|
| 1 |  | VSS | VSS | VSS | VSS | VSS |
| 2 | I | BS | BS | BS | BS | BS |
| 3 | I/O | VCC | DAT1 | DAT1/D- | DAT1/PeTn | DAT1/T- |
| 4 | I/O | DAT0 | DAT0 | DAT0/D+ | DAT0/PeTp | DAT0/T+ |
| 5 | I/O | RSV | DAT2 | DAT2 | DAT2/PeRn | DAT2/R- |
| 6 | O | INS | INS | INS | INS | INS |
| 7 | I/O | RSV | DAT3 | DAT3 | DAT3/PeRp | DAT3/R+ |
| 8 | I | SCLK | SCLK | SCLK | SCLK | SCLK |
| 9 |  | VCC | VCC | VCC | VCC | VCC |
| 10 |  | VSS | VSS | VSS | VSS | VSS |

FIG. 12B

| PIN | DIRECTION | MICRO SD | MUSB | MPCIe/EUSB | eSATA |
|---|---|---|---|---|---|
| 1 | I/O | DAT2 | DAT2 | DAT2/PeRn | DAT2/R- |
| 2 | I/O | CD/DAT3 | CD/DAT3 | CD/DAT3/PeRp | CD/DAT3/R+ |
| 3 | I/O | CMD | CMD | CMD | CMD |
| 4 |  | VDD | VDD | VDD | VDD |
| 5 | I | CLK | CLK | CLK | CLK |
| 6 |  | VSS | VSS | VSS | VSS |
| 7 | I/O | DAT0 | DAT0/D+ | DAT0/PeTp | DAT0/T+ |
| 8 | I/O | DAT1 | DAT1/D- | DAT1/PeTn | DAT1/T- |

FIG. 12C

| PIN NO. | NAME |
|---|---|
| S1 | D-/DAT3 |
| S2 | CM,D (OOPT.) |
| S3 | VSS1 |
| S4 | VDD |
| S5 | CLK (OPT.) |
| S6 | VSS2 |
| S7 | D+/DAT0 |
| S8 | DAT1 (OPT.) |
| S9 | DAT2 (OPT.) |

| PIN NO. | NAME |
|---|---|
| M1 | VSS |
| M2 | BS |
| M3 | D-/DAT1 |
| M4 | D+/DAT0 |
| M5 | A-/DAT2 |
| M6 | INS |
| M7 | A+/DAT3 |
| M8 | SCLK (OPT.) |
| M9 | VCC |
| M10 | VSS |

| PIN NO. | NAME |
|---------|------|
| P1 | DAT2 |
| P2 | CD/DAT3 |
| P3 | CMD |
| P4 | VDD |
| P5 | CLK |
| P6 | VSS |
| P7 | DAT0 |
| P8 | DAT1 |

EXTENDED SD AND MICROSD HOSTS AND DEVICES WITH USB-LIKE HIGH PERFORMANCE PACKETIZED INTERFACE AND PROTOCOL

RELATED APPLICATIONS

This application is a continuation-in-part (CIP) of U.S. patent application Ser. No. 11/624,667, filed Jan. 18, 2007, entitled "Electronic Data Storage Medium with Fingerprint Verification Capability".

This application is also a CIP of U.S. patent application Ser. No. 10/854,004, filed May 25, 2004, entitled "Extended Secure-Digital (SD) Card Devices and Hosts", which is a CIP of application Ser. No. 10/708, 634, filed Mar. 16, 2004, entitled "Extended Secure-Digital Interface using a second Protocol for Faster Transfers", now U.S. Pat. No. 7,069,369.

This application is also a CIP of U.S. patent application Ser. No. 10/917,576, filed Aug. 13, 2004, entitled "Differential Data Transfer for Flash Memory Card" and CIP of U.S. patent application Ser. No. 11/864,696, filed Sep. 28, 2007, entitled "Backward Compatible Extended-MLC USB Plug And Receptacle with Dual Personality".

FIELD OF THE INVENTION

The present invention relates generally to USB and Extended USB devices. More particularly, this invention relates to higher performance protocols used with Extended USB devices.

BACKGROUND

Flash-memory cards are widely used for storing digital pictures captured by digital cameras. One useful format is the Secure-Digital (SD) format, which is an extension of the earlier MultiMediaCard (MMC) format. SD cards are thin and the area of a large postage stamp. Sony's Memory Stick (MS) is another digital-file-card format that is shaped somewhat like a stick of chewing gum.

SD cards are also useful as add-on memory cards for other devices, such as portable music players, personal digital assistants (PDAs), and even notebook computers. SD cards are hot-swappable, allowing the user to easily insert and remove SD cards without rebooting or cycling power. Since the SD cards are small, durable, and removable, data files can easily be transported among electronic devices by being copied to an SD card. SD cards are not limited to flash-memory cards, but other applications such as communications transceivers can be implemented as SD cards.

The SD interface currently supports a top transfer rate of 100 Mb/s, which is sufficient for many applications. However, some applications such as storage and transport of full-motion video could benefit from higher transfer rates.

Other bus interfaces offer higher transfer rates. Universal-Serial-Bus (USB) has a top transfer rate of 480 Mb/s. Peripheral-Component-Interconnect (PCI) Express, at 2.5 Gb/s, and Serial-Advanced-Technology-Attachment (SATA), at 1.5 Gb/s and 3.0 Gb/s, are two examples of high-speed serial bus interfaces for next generation devices. IEEE 1394 (Firewire) supports 3.2 Gb/s. Serial Attached Small-Computer System Interface (SCSI) supports 1.5 Gb/s or 3.0 Gb/s. These are 5 to 32 times faster than the SD interface.

A new removable-card form-factor known as ExpressCard has been developed by the Personal-Computer Memory Card International Association (PCMCIA), PCI, and USB standards groups. ExpressCard 26 is about 75 mm long, 34 mm wide, and 5 mm thick and has ExpressCard connector 28. ExpressCard provides both USB and PCI Express interfaces on the same 26-pin card connector.

Serial-ATA is used mostly as an internal expansion interface on PC's, since it requires two separate connectors. A first 7-pin connector carries signals while a second 15-pin connector is for power. ExpressCard's large 26-pin connector limits its usefulness and increases the physical size of devices using ExpressCard connectors. Compact-Flash cards also tend to be larger in size than SD cards since Compact-Flash has more connector pins.

SD and MMC are complementary card interfaces, and are sometimes lumped together and referred to as SD/MMC cards. The older MMC cards have 7 metal connector pads while SD has 9 connector pads. MMC cards can fit in SD slots, and SD cards can fit in MMC slots. However, the host must determine which type of card is inserted into its slot. When a MMC card is inserted, only 7 pads are used, while the additional 2 pads are used when a SD card is detected in the slot.

FIG. 1A is a block diagram illustrating an MMC system in which a MMC card 110 communicating with a host card controller 120 of a host device 130 via MMC bus 150 and socket 130. MMC card 110 includes a memory array 113, an MMC protocol controller 112, and an MMC datapath 111. Host card controller 120 includes an application adapter 123, an MMC protocol controller 122, and an MMC datapath 121. MMC card 110 may be any of the versions as shown in FIGS. 1B-1C.

FIG. 2A shows a prior-art card-detection routine executed by a host. The host, such as a host personal computer (PC) detects when a card is inserted into a slot, step 200, such as by detecting the card-detect (CD) pin that is pulled high by a resistor on the SD card. The host sends a sequence of commands to the inserted card that includes a CMD55 command, step 202. If the card does not respond properly to the CMD55 command, step 204, then the card is an MMC card, not a SD card. A sequence of commands is sent to the MMC card, step 206, which includes the CMD1 command. The MMC card is then initialized by a sequence of commands, such as the host reading configuration registers on the MMC card, step 208. The host uses the 7 pins shared with MMC to communicate with the MMC card.

When the inserted card responds to the CMD 55 command, step 204, then the card may be a SD card. Further commands are sent to the card including the advanced command ACMD41, step 210. If the card does not respond properly to the ACMD41, step 212, then the card fails, step 214.

When the card responds properly to the ACMD41, step 210, then the card is an SD card. The SD card is then initialized by a sequence of commands, such as the host reading configuration registers on the SD card, step 216. The host uses the 9-pin SD interface to communicate with the SD card. The host can use one data line or up to four data lines in the SD interface for communication. Data stored on the SD card can be encrypted using higher-level security protocols.

FIG. 2B is a flowchart of a prior-art detection-response routine executed by a SD card. The SD card obtains power from the metal contact pads when inserted into the host slot and powers up, step 220. A card-initialization routine is started, step 222, which may include various internal self-checks. A controller inside the SD card executes these routines, activates the external interface, and then waits for commands from the host. When a CMD55 is received from the host, step 224, then the SD controller waits for an ACMD41 from the host, step 226. The card responds to the ACMD41 from the host, step 228. The SD card is then ready to receive further commands from the host, step 230. The full 9-pin SD interface is used.

While either MMC or SD cards can be detected, the transfer rate using either MMC or SD cards is slower than many current bus standards. Applications such as video transfers could benefit from a higher-speed interface to a SD card. The thin, small size of the SD card is beneficial, but the slow transfer rates could limit SD-card use in the future. A higher-speed interface to the SD card is desired, as is a detection scheme for use when higher-speed interfaces are available.

SUMMARY OF THE DESCRIPTION

Techniques for extended SD and micro-SD hosts and devices with USB-like high performance packetized interface and protocol are described herein. An extended Secure-Digital (SD) card has a second interface that uses some of the SD-interface lines. The SD card's mechanical and electrical card-interface is used, but 2 or 4 signals in the SD interface are multiplexed for use by the second interface. The second interface can have a single differential pair of serial-data lines to perform Universal-Serial-Bus (USB) transfers, or two pairs of differential data lines for Serial-Advanced-Technology-Attachment (SATA), Peripheral Component Interconnect Express (PCIE), or IEEE 1394 transfers. A card-detection routine on a host can initially use the SD interface to detect extended capabilities and command the card to switch to using the second interface. The extended SD card can communicate with legacy SD hosts using just the SD interface, and extended SD hosts can read legacy SD cards using just the SD interface, or extended SD cards using the second interface. MultiMediaCard and Memory Stick are alternatives.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 10 is a table showing signal multiplexing with a 9-pin SD connector.

FIG. 11 is a table showing signal multiplexing with a 7-pin MMC connector.

FIG. 12A is a table showing pin multiplexing for an extended 13-pin connector.

FIG. 12B is a table showing pin multiplexing for a 10-pin Memory Stick system.

FIG. 12C is a table showing pin multiplexing for an 8-pin Micro-SD system.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

The existing physical and electrical specifications for the SD card can be used while still supporting higher-speed transfers. The signals from the 9-pin SD-card interface can be multiplexed to controllers for other interfaces that support higher-speed transfers, such as USB, IEEE 1394, SATA, PCI-Express, etc. Thus data transfers can occur using higher-bandwidth protocols using the existing physical SD interface pins.

The invention can include a multi-personality host and card system. The application combinations include: a multi-personality host and a multi-personality device, a multi-personality host and a single-personality device, a single-personality host and a multi-personality device, and a single-personality host and a single-personality device.

An SD card modified to use a higher-speed serial bus is a very-high-speed SD card, or a ESD card, while a host that can communicate with a ESD card is a ESD host. A ESD card can act as a SD card when inserted into a legacy SD host, while a ESD host can read inserted SD cards. Thus the ESD card and host are backward-compatible.

Figure 3:
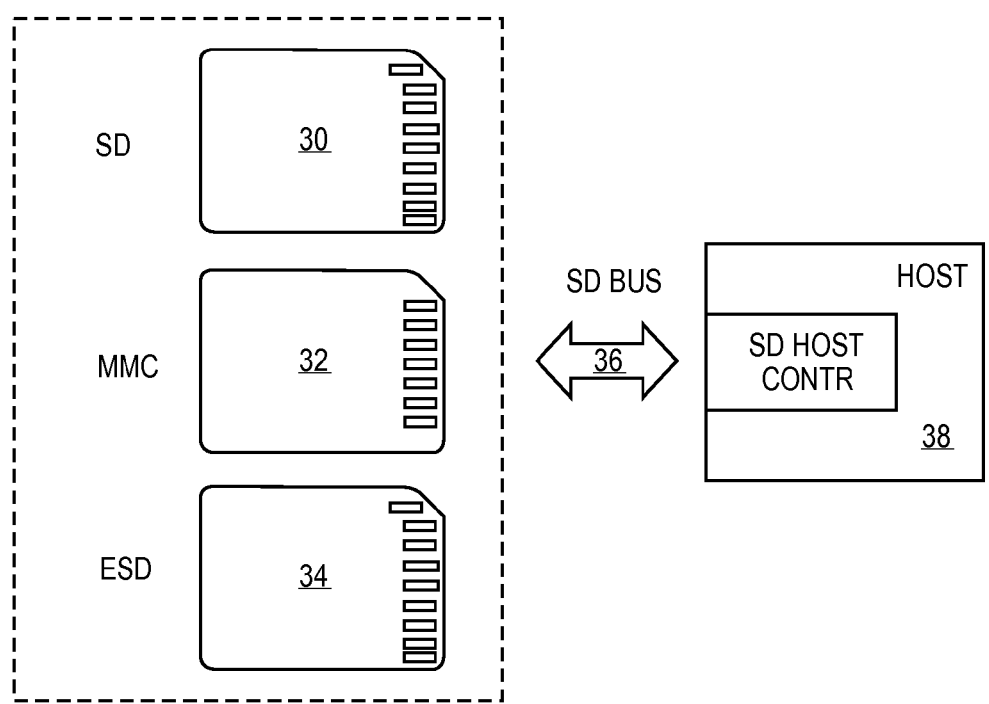
FIG. 3 shows a SD host accepting an MMC card, an SD card, or an Extended Secure-Digital (ESD) card.

FIG. 3 shows a SD host accepting a MMC card, a SD card, or a ESD card. Host 38 is a legacy SD host that can detect and accept SD card 30 or MMC card 32. When ESD card 34 is inserted, the SD host controller on host 38 detects a SD card and configures ESD card 34 to operate as a SD card over the normal 9-pin SD interface and SD bus 36.

MMC card 32 has only 7 metal pads and uses 2 fewer of the lines on SD bus 36 than does SD card 30. SD card 30 has two extra metal pads that are not present on MMC card 32. One extra metal pad is added near the beveled corner of SD card 30, while another extra pad is added on the other side of the 7 metal pads. ESD card 34 has the same arrangement of the 9 metal pads as SD card 30, and can communicate over SD bus 36 with host 38 using the standard SD interface and protocol.

Figure 4:
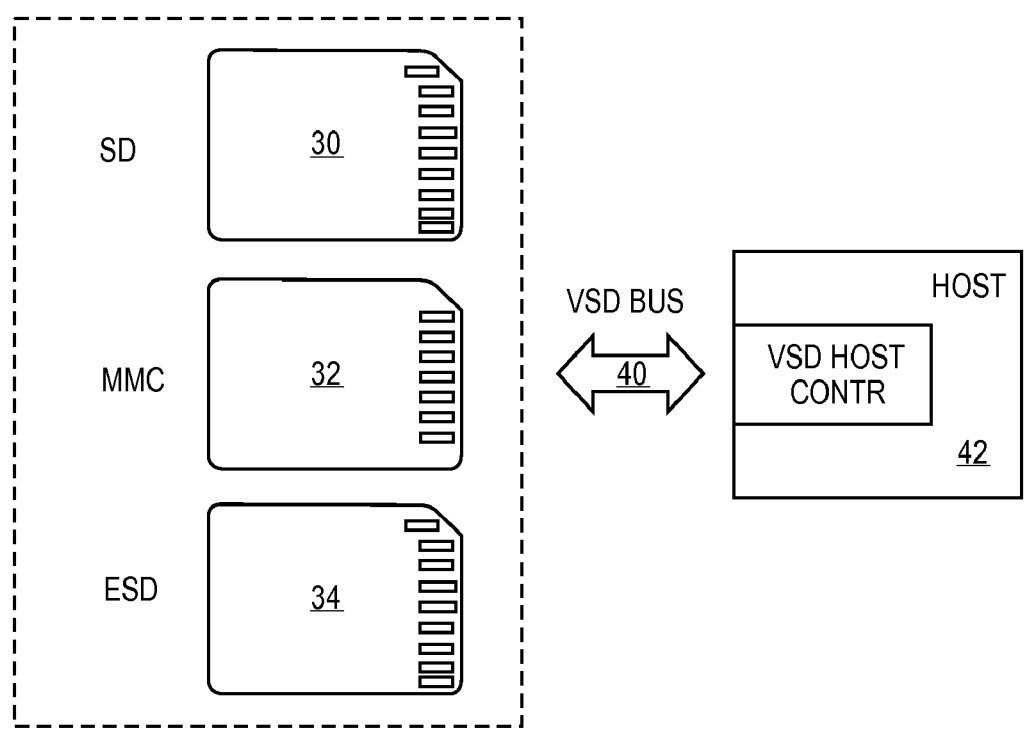
FIG. 4 shows an extended ESD host accepting an MMC card, an SD card, or an ESD card.

FIG. 4 shows an extended ESD host accepting a MMC card, a SD card, or a ESD card. Extended host 42 is a ESD host that can detect and accept SD card 30 or MMC card 32 or ESD card 34. When MMC card 32 is inserted, extended host 42 uses 7 pins of ESD bus 40 to communicate using the MMC pins and protocol. When SD card 30 is inserted, extended host 42 uses 9 pins of ESD bus 40 to communicate using the SD pins and protocol.

When ESD card 34 is inserted, the host controller on extended host 42 detects a ESD card and configures ESD card 34 to operate in extended mode using a high-speed serial-bus standard such as USB over ESD bus 40. Higher-bandwidth data transfers can then occur over ESD bus 40 using one of the serial-bus standards, such as USB, IEEE 1394, SATA, or PCI-Express.

ESD card 34 has the same arrangement of the 9 metal pads as SD card 30, but contains an internal controller that can couple an internal serial-bus controller to the metal pads rather than the normal SD controller. For example, a USB controller inside ESD card 34 can be coupled to some of the metal pads when ESD card 34 is operating in extended ESD mode.

Figure 5:
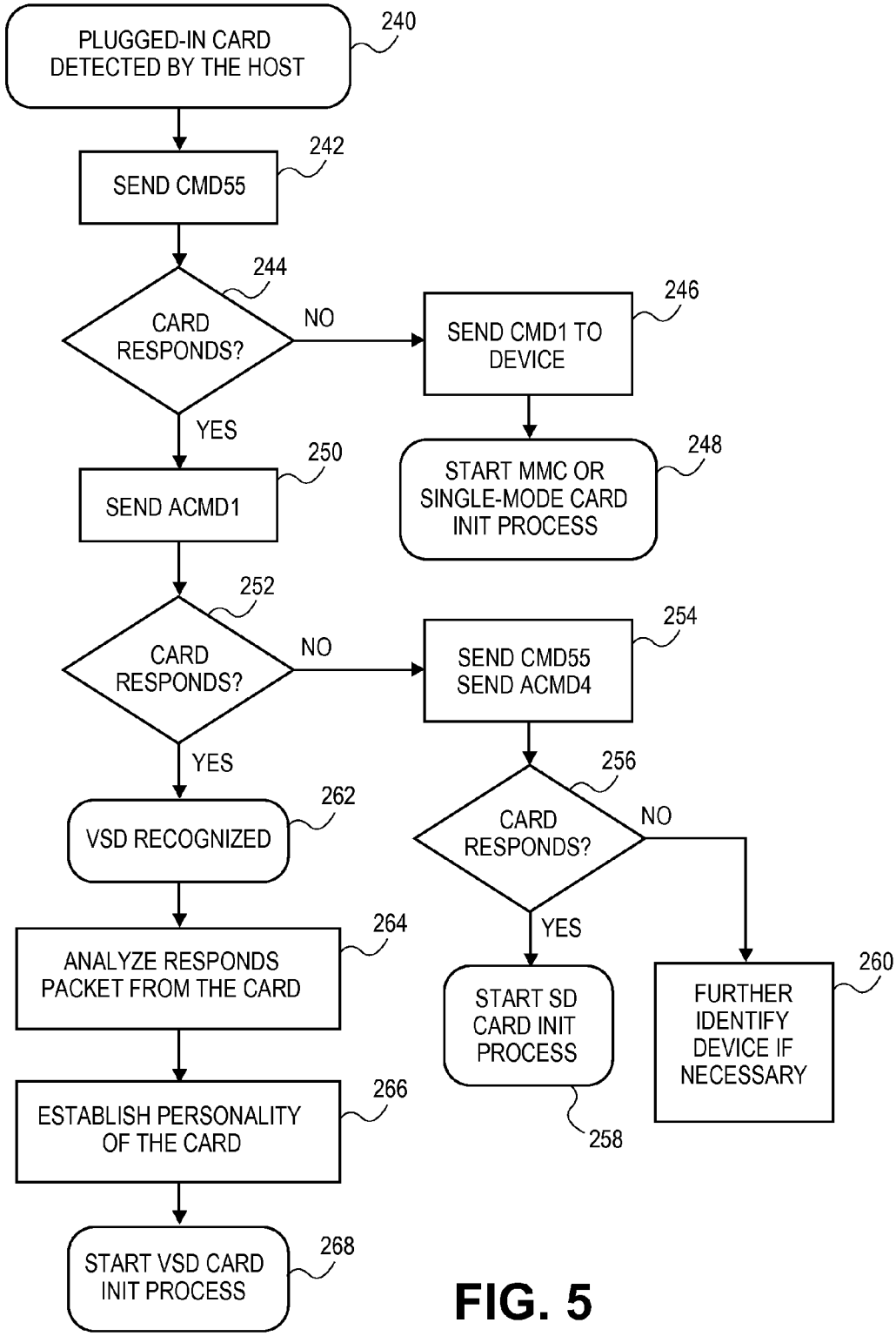
FIG. 5 is a flowchart of an extended ESD card-detection routine executed by an ESD host.

FIG. 5 is a flowchart of an extended ESD card-detection routine executed by a ESD host. The host, such as a host personal computer (PC) detects when a card is inserted into a slot, step 240, such as by detecting the card-detect (CD) pin that is pulled high by a resistor on the SD or ESD card. The ESD host sends a sequence of commands to the inserted card that includes a CMD55 command, step 242. If the card does not respond properly to the CMD55 command, step 244, then the card could be an MMC card, or a single-mode card, but not a SD or a ESD card. A sequence of commands is then sent to the card, step 246, including the CMD1 command. If card responds properly to the CMD1 command, then the card is an MMC card. The MMC card is then initialized by a sequence of commands, such as the host reading configuration registers on the MMC card, step 248. The host uses the 7 pins shared with MMC to communicate with the MMC card. If card dose not respond properly, the host may try to communicate with the card by switching to a different mode.

When the inserted card responds to the CMD 55 command, step 244, then the card may be a ESD card or a SD card. Further commands are sent to the card including the advanced ESD command ACMD1, step 250. If the card does not respond properly to the ACMD1, step 252, then the card cannot be a ESD card. The command sequence starts over again, re-sending the CMD55 command and later the ACMD41 command, step 254. ACMD1 is a specially-defined advanced command that only a ESD card responds to in the expected manner. For example, a ESD card could respond with a unique code used only for ESD.

When the card responds properly to the ACMD55 and ACMD41 commands, step 256, then the card is an SD card. The SD card is then initialized by a sequence of commands, such as the host reading configuration registers on the SD card, step 258. The host uses the 9-pin SD interface to communicate with the SD card. The host can use one data line or up to four data lines in the SD interface for communication. Data stored on the SD card can be encrypted using higher-level security protocols.

When the card does not respond properly to the ACMD55 and ACMD41 commands, step 256, then the card is another type of card. Further identification of the card type may be performed, step 260, or the card-detection routine can fail.

When the card responds properly to the ACMD1, step 252, then the card is a ESD card, step 262. The extended host can analyze responses from the card from this and other commands, step 264, to establish the personality and capabilities of the ESD card, step 266.

The ESD card is then initialized by a sequence of commands, such as the host reading configuration registers on the SD card, step 268. One of the extended serial-bus protocol processors is activated and connected to some of the 9 metal pads of the ESD bus to allow for extended-mode data transfers.

Figure 6:
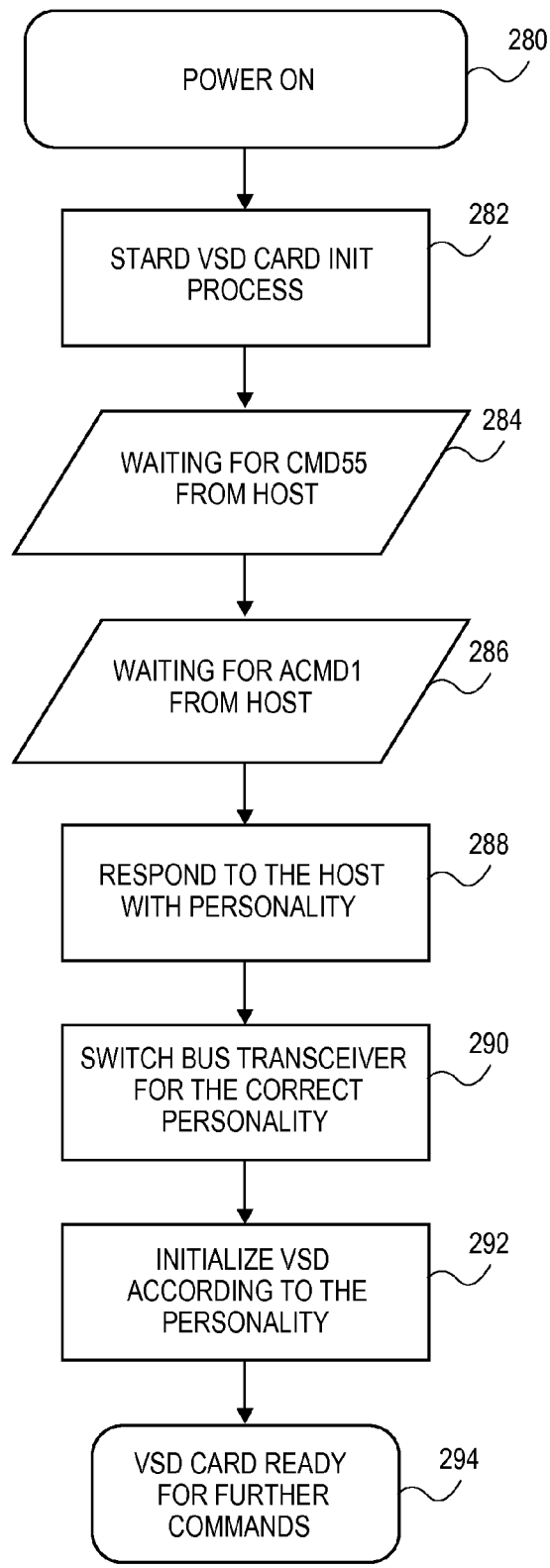
FIG. 6 is a flowchart of an ESD detection-response routine executed by an ESD card.

FIG. 6 is a flowchart of a ESD detection-response routine executed by a ESD card. The ESD card obtains power from the metal contact pads when inserted into the host slot and powers up, step 280. A card-initialization routine is started, step 282, which may include various internal self-checks. A controller inside the ESD card executes these routines, activates the external interface, and then waits for commands from the host. If it is a single-mode card, then the card waits for the host to switch to the same mode to communicate. If it is not a single-mode card, then it waits for the CMD55 command from host.

When a CMD55 is received from the host, step 284, then the ESD controller waits for the ACMD1 from the host, step 286. The ESD card responds to the ACMD1 from the ESD host by listing the available extended-serial-bus protocols that the card supports, step 288. The host chooses one of the available protocols that the host also supports. The card changes its bus transceivers to connect one of the extended serial-bus protocol processors to some of the 9 SD pins, step 290. For example, USB may be supported.

The host sends a command to the ESD card indicating which protocol to use, step 292. The ESD card then initializes the selected protocol processor and couples it to the appropriate pins on the ESD bus. The ESD card is then ready to receive further commands from the host, step 294.

Figure 7:
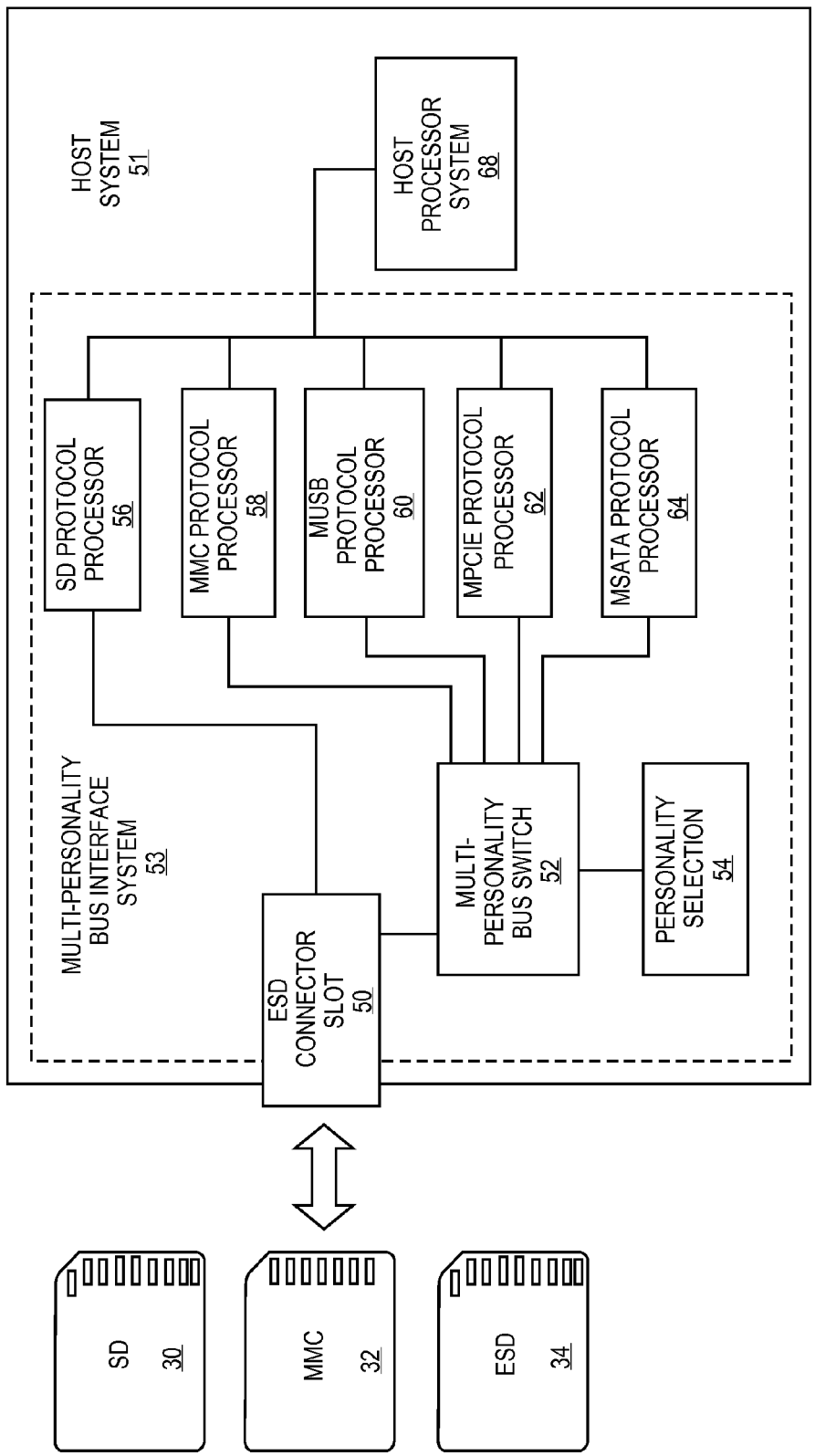
FIG. 7 is a block diagram of a host with an SD connector slot that supports extended-mode communication.

FIG. 7 is a block diagram of a host with an SD connector slot that supports extended-mode communication. SD card 30, MMC card 32, or ESD card 34 could be plugged into ESD connector slot 50 of host 51. Each card can operate in its own standard mode.

Host 51 has processor system 68 for executing programs including card-management and bus-scheduling programs. Multi-personality bus interface 53 processes data from processor system 68 using various protocols. SD processor 56 processes data using the SD protocol, and inputs and outputs data on the SD data lines in ESD connector slot 50. Other protocols communicate with ESD connector slot 50 through multi-personality bus switch 52, which selects one protocol processor.

The contact pins in ESD connector slot 50 connect to multi-personality bus switch 52 as well as to SD processor 56. Transceivers in multi-personality bus switch 52 buffer data to and from the transmit and receive pairs of differential data lines in the metal contacts for extended protocols such as PCI-Express, Firewire IEEE 1394, Serial-Attached SCSI, and SATA, and for the older MultiMediaCard.

When an initialization routine executed by processor system 68 determines that inserted card is a MMC card, MMC processor 58 is activated to communicate with MMC card 32 inserted into ESD connector slot 50, while SD processor 56 is disabled. Personality selector 54 configures multi-personality bus switch 52 to connect ESD connector slot 50 to MMC processor 58 when processor system 68 determines that the inserted card is MMC. When the inserted card is SD card 30, SD processor 56 continues to communicate with the card after initialization is complete.

When the initialization routine executed by processor system 68 determines that inserted card is ESD card 34, SD processor 56 continues to communicate with ESD card 34 until the capabilities of ESD card 34 are determined. Then one of the higher-speed serial-bus protocols is selected for use. For example, when processor system 68 determines that ESD card 34 supports PCI-Express, personality selector 54 configures multi-personality bus switch 52 to connect ESD connector slot 50 to PCI-Express processor 62. Then processor system 68 communicates with PCI-Express processor 62 instead of SD processor 56 when PCIE extended mode is activated.

When the initialization routine executed by processor system 68 determines that the inserted card is ESD card 34, and supports USB, personality selector 54 configures multi-personality bus switch 52 to connect ESD connector slot 50 to USB processor 60. Then processor system 68 communicates with USB processor 60 instead of SD processor 56 when USB extended mode is activated.

When the initialization routine executed by processor system 68 determines that the inserted card is ESD card 34 that supports SATA, personality selector 54 configures multi-personality bus switch 52 to connect ESD connector slot 50 to SATA processor 64. Then processor system 68 communicates with SATA processor 64 instead of SD processor 56 when SATA extended mode is activated.

When the initialization routine executed by processor system 68 determines that the inserted card is ESD card 34 that supports Firewire, personality selector 54 configures multi-personality bus switch 52 to connect ESD connector slot 50 to IEEE 1394 processor 66. Then processor system 68 communicates with IEEE 1394 processor 66 instead of SD processor 56 when IEEE 1394 extended mode is activated. ESD card 34 may support more than one extended protocol. Then processor system 68 can select from among the supported protocols. For example, the faster protocol may be selected. ESD host 51 may not support all protocols shown in FIG. 7, but may only support a subset.

Figure 8:
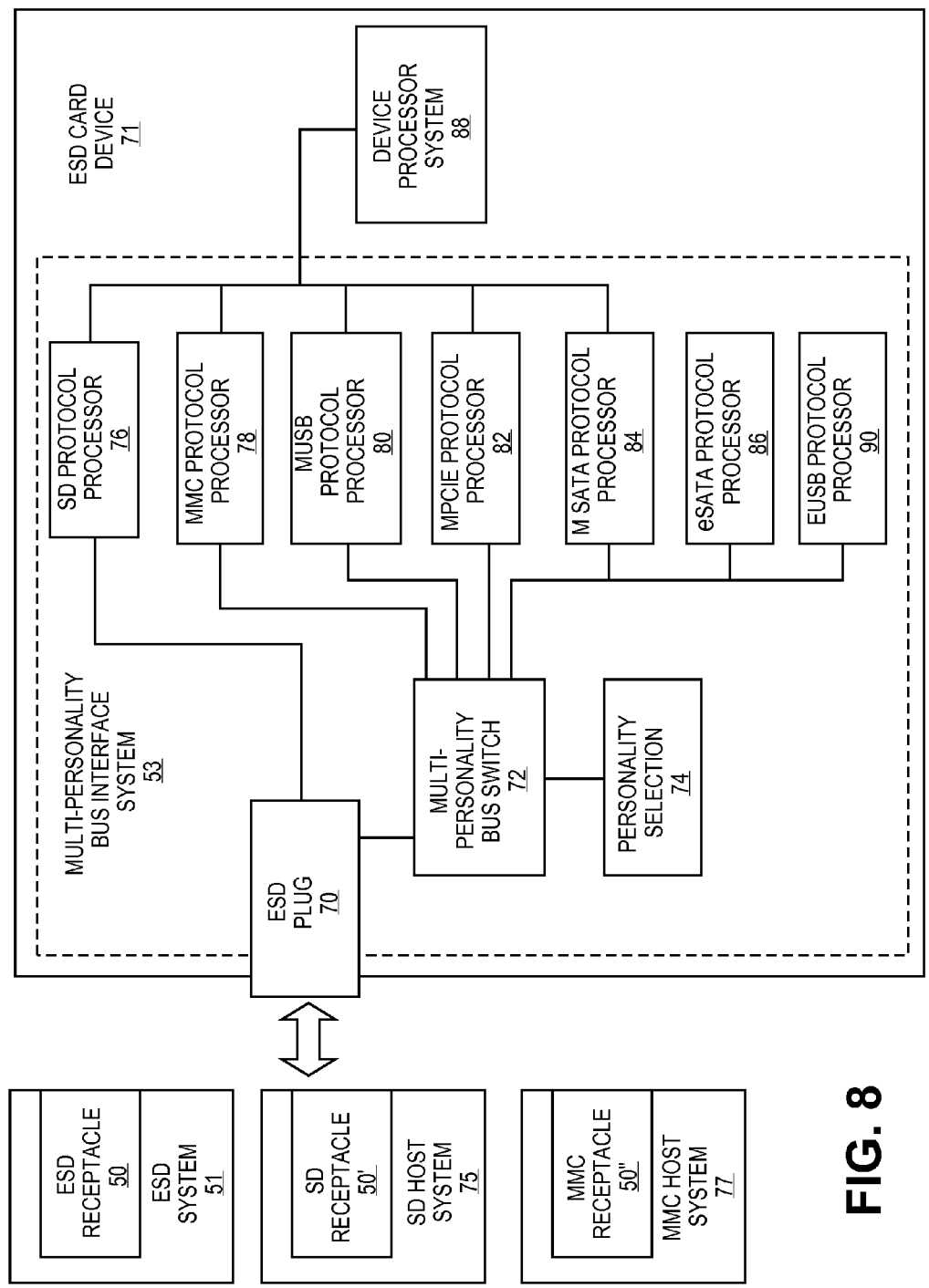
FIG. 8 is a block diagram of an ESD card device with an SD connector that supports ESD extended-mode communication.

FIG. 8 is a block diagram of a ESD card device with an SD connector that supports ESD extended-mode communication. ESD card device 71 could be ESD card 34 of FIG. 7, or ESD card 34 could have only a subset of all the protocol processors that ESD card device 71 has. Likewise, ESD host 51' could be the same as ESD host 51 of FIG. 7, or could have only a subset of all the protocol processors that ESD host 51 of FIG. 7 has.

ESD connector 70 of ESD card device 71 could be plugged into SD connector slot 50 of ESD host 51'. ESD connector 70 of ESD card device 71 could also be plugged into SD connector slot 50' of SD host 75, which does not support ESD mode, or ESD connector 70 of ESD card device 71 could be plugged into SD connector slot 50" of MMC host 77, which does not support ESD mode, but does support MMC or SPI mode.

Card device 71 has processor system 88 for executing programs including card-initialization and bus-response programs. Multi-personality bus interface 73 processes data from processor system 88 using various protocols. SD processor 76 processes data using the SD protocol, and inputs and outputs data on the SD data lines in ESD connector 70. Other protocol processors communicate with ESD connector 70 through multi-personality bus switch 72, which selects one protocol processor.

The contact pins in ESD connector 70 connect to multi-personality bus switch 72 as well as to SD processor 76. Transceivers in multi-personality bus switch 72 buffer data to and from the transmit and receive pairs of differential data lines in the metal contacts for extended protocols such as PCI-Express, Firewire IEEE 1394, Serial-Attached SCSI, and SATA, and for the older MultiMediaCard.

When an initialization routine executed by processor system 88 is commanded to use MMC-compatible SPI mode, when the host is MMC host 77, MMC processor 78 is activated to communicate with MMC host 77 connected to ESD connector 70, while SD processor 76 is disabled. Personality selector 74 configures multi-personality bus switch 72 to connect ESD connector 70 to MMC processor 78 when processor system 88 is commanded to use MMC-compatible mode. When the host is SD host 51, SD processor 76 continues to communicate with SD host 75 after initialization is complete.

When the host initialization routine determines that both ESD card device 71 and ESD host 51' can support ESD mode, ESD host 51' sends a command through SD processor 76 to processor system 88 to switch to ESD mode. Then one of the higher-speed serial-bus protocols is selected for use. For example, when processor system 88 is commanded to use PCI-Express, personality selector 74 configures multi-personality bus switch 72 to connect ESD connector 70 to PCI-Express processor 82. Then processor system 88 communicates with PCI-Express processor 82 instead of SD processor 76 when PCIE extended mode is activated.

When the host initialization routine determines that the inserted card supports ESD with USB, processor system 88 is commanded to switch to USB mode. Personality selector 74 configures multi-personality bus switch 72 to connect ESD connector 70 to USB processor 80. Then processor system 88 communicates with USB processor 80 instead of SD processor 76 when USB extended mode is activated.

When the host initialization routine determines that the inserted card supports ESD with SATA, processor system 88 is commanded to switch to SATA mode. Personality selector 74 configures multi-personality bus switch 72 to connect ESD connector 70 to SATA processor 84. Then processor system 88 communicates with SATA processor 84 instead of SD processor 76 when SATA extended mode is activated.

When the host initialization routine determines that the inserted card supports ESD with eSATA, processor system 88 is commanded to switch to an eSATA mode. Personality selector 74 configures multi-personality bus switch 72 to connect ESD connector 70 to eSATA processor 86. Then processor system 88 communicates with eSATA processor 86 instead of SD processor 76 when the eSATA extended mode is activated.

When the host initialization routine determines that the inserted card supports ESD with EUSB, processor system 88 is commanded to switch to an EUSB mode. Personality selector 74 configures multi-personality bus switch 72 to connect ESD connector 70 to EUSB processor 90. Then processor system 88 communicates with EUSB processor 90 instead of SD processor 76 when the EUSB extended mode is activated.

ESD card device 71 may not support all protocols shown in FIG. 8, but may only support a subset. Some of protocol processors may be absent in some embodiments.

Figure 8A:
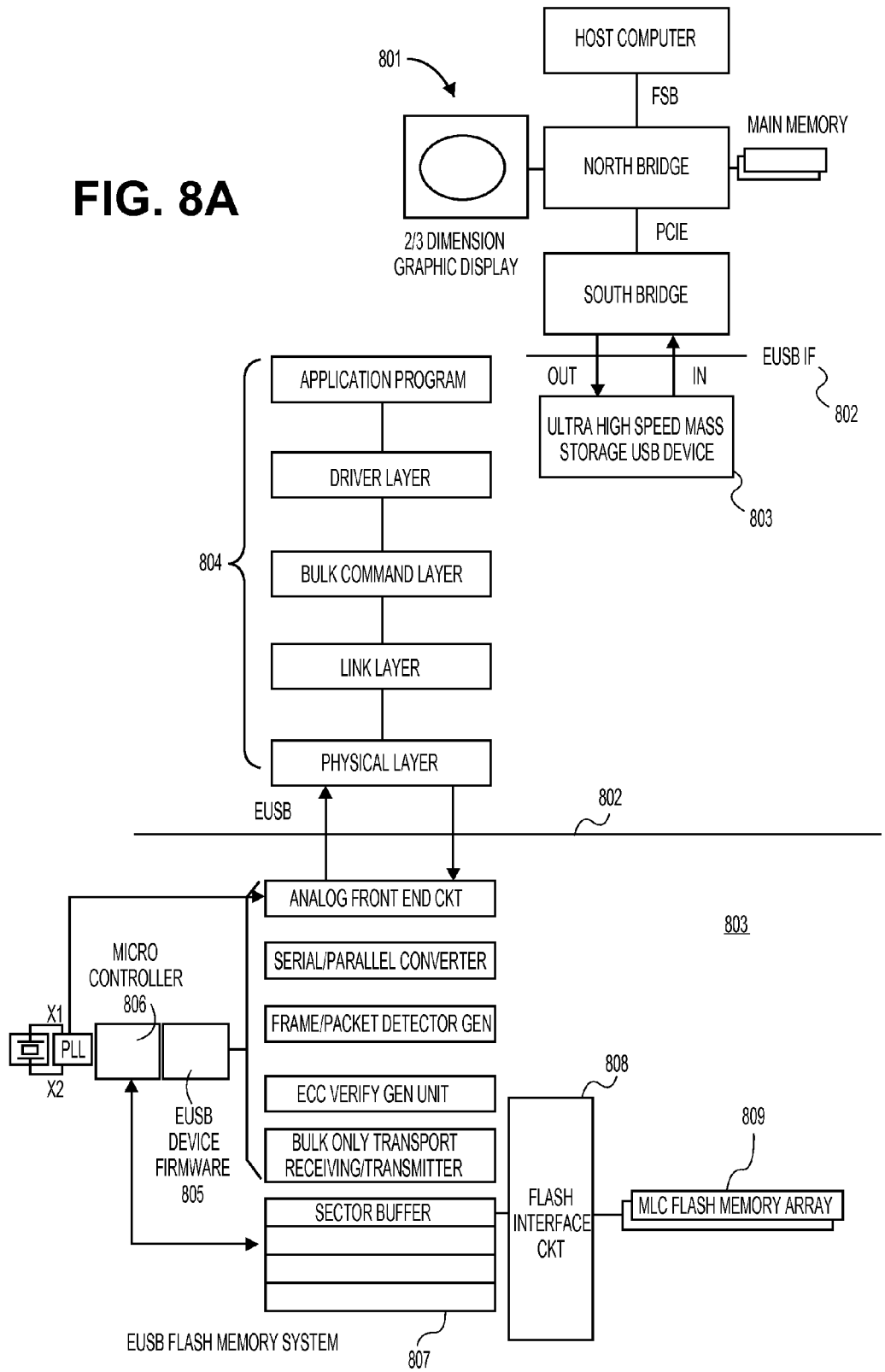
FIGS. 8A-8D are block diagrams illustrating examples of EUSB system architectures according to certain embodiments of the invention.

FIG. 8A is a block diagram illustrating an exemplary extended USB (EUSB) system according to one embodiment of the invention. As hardware configuration, an EUSB device 803 is coupled to a host system 801 via an EUSB interface 802. Host 801 can be any of computer having an EUSB interface 802, including one or more processors coupled to, for example, via a front-side bus (FSB) a memory controller (also referred to as a north bridge) of which a main memory and a display device is attached. The memory controller is coupled to, for example, a PCI express bus to an IO controller (also referred to as a south bridge), from which an EUSB device 803 is attached.

Within the host computer, a software network stack 804 is used by the host 801 to communicate with the EUSB device 803. Similar to a network stack such as an OSI (Open Systems Interconnection) network stack, network stack 804 includes an application layer, a driver layer, a bulk command layer, a data link layer, and a physical layer. In one embodiment, the bulk command layer is configured to package one or more commands in a bulk embedded within a packet such that a single packet may carry one or more commands to one or more recipients as a bulk. As a result, the speed of the communications may be greatly enhanced.

EUSB device 803 includes an EUSB firmware 805 having an analog front end, a serial/parallel converter, a frame/packet detector/generator, an ECC (error correction code) verify/generator unit, a bulk only transport (BOT) receiving/transmitter. The EUSB device 803 further includes a micro controller 806 controlling a buffer 807 for buffering the packets which may be stored or read to/from MLC (multi-level cell) flash memory array 809 via interface circuit 808.

Figure 8B:
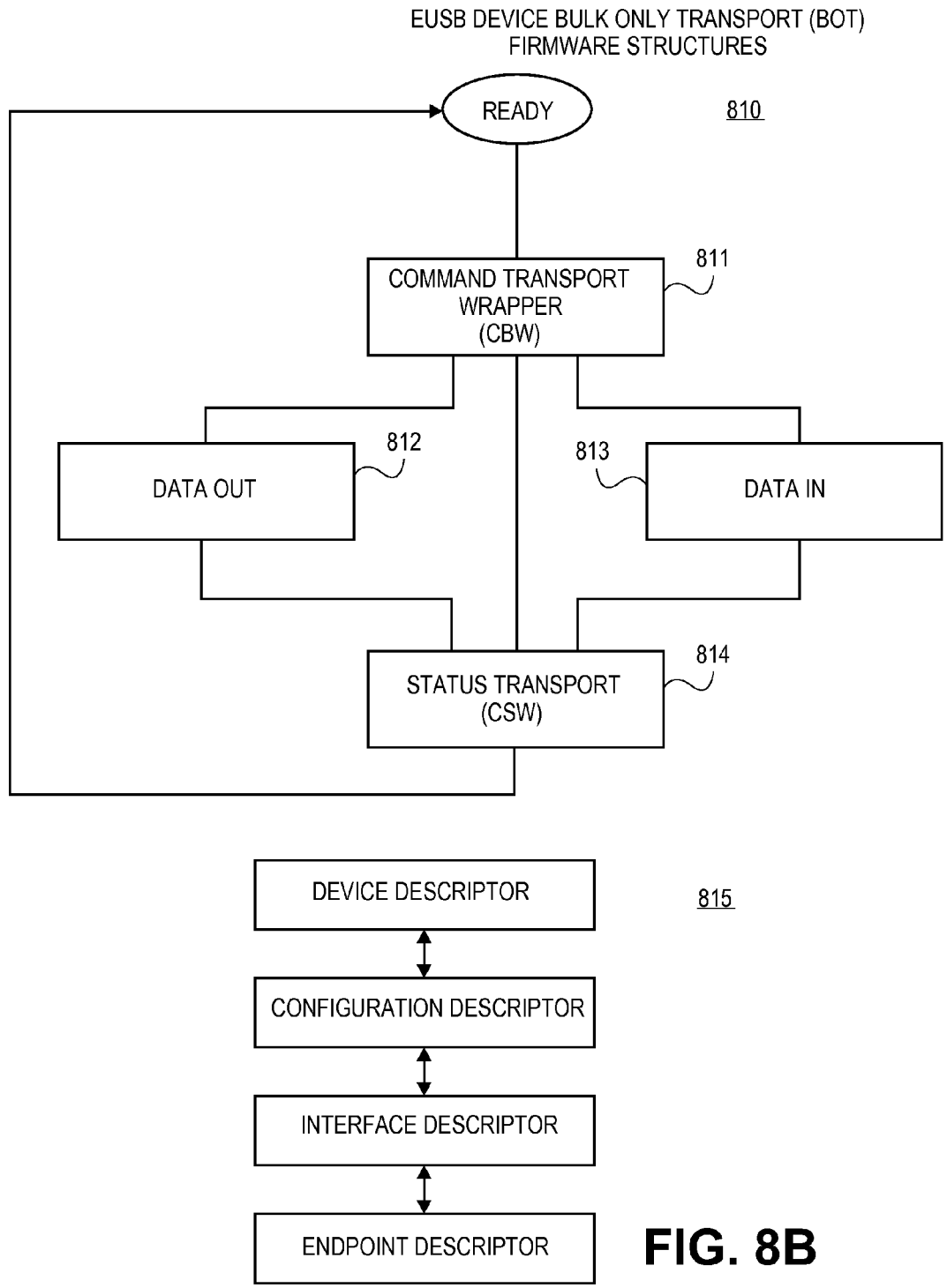

FIG. 8B is a block diagram illustrating an example of bulk-only transport (BOT) firmware structure according to one embodiment. Referring to FIG. 8B, BOT firmware structure 810 includes a command transport wrapper 811, data out unit 812, data in unit 813, and a status transport 814. A data structure used by the EUSB BOT firmware structure 810 includes a device descriptor, a configuration descriptor, an interface descriptor, and an endpoint descriptor.

Figure 8C:
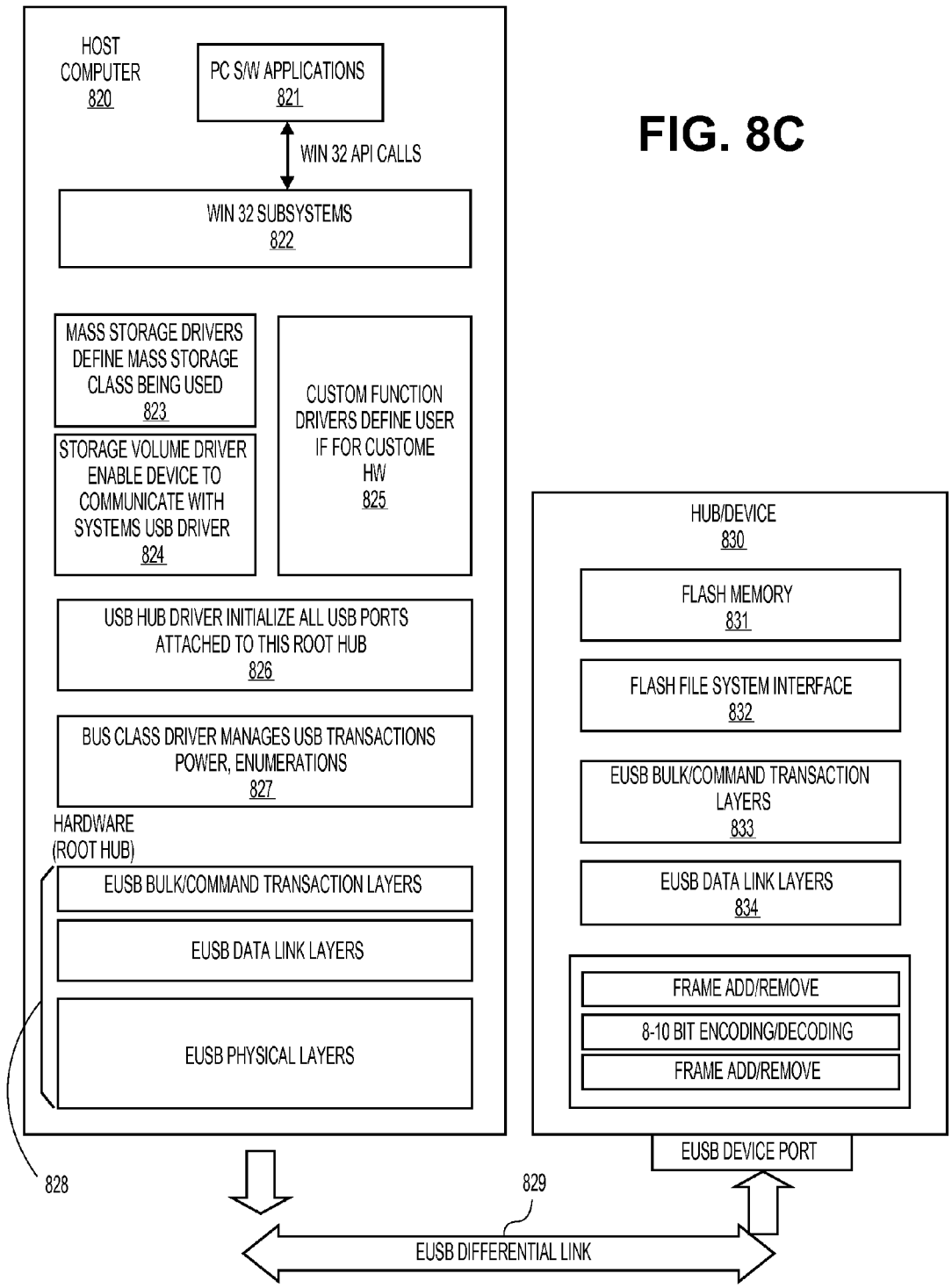

FIG. 8C is a block diagram illustrating a system configuration in which an EUSB device is coupled to a host system according to one embodiment. Referring to FIG. 8C, host computer 820 is communicatively coupled to an EUSB device 830 via an EUSB differential link 829 which has been described in one of the above incorporated by reference co-pending application assigned to a common assignee of the present application. The host 820, in this example, with a Windows operating system available from Miscrosoft Corporation, includes one or more applications 821 communicating with a Win32 subsystem 822. The host 820 further includes mass storage drivers 823 that define mass storage classes being used and storage volume drivers 824 that enable devices to communicate with a system USB driver. The host 820 further includes customized function drivers that define user interfaces for customized hardware. In addition, the host 820 further includes a USB hub driver 826 for initializing all USB ports transactions, power, and/or enumerations. The host 820 further includes a bus class driver 827 for managing the same. The host 820 further includes an EUSB stack 828, including a bulk command transport layer, data link layer, and a physical layer. Similarly, USB device 830 includes a flash memory 831, a flash file system interface 832, a bulk command transport layer 833, a data link layer 834, and a physical layer 835.

Figure 8D:
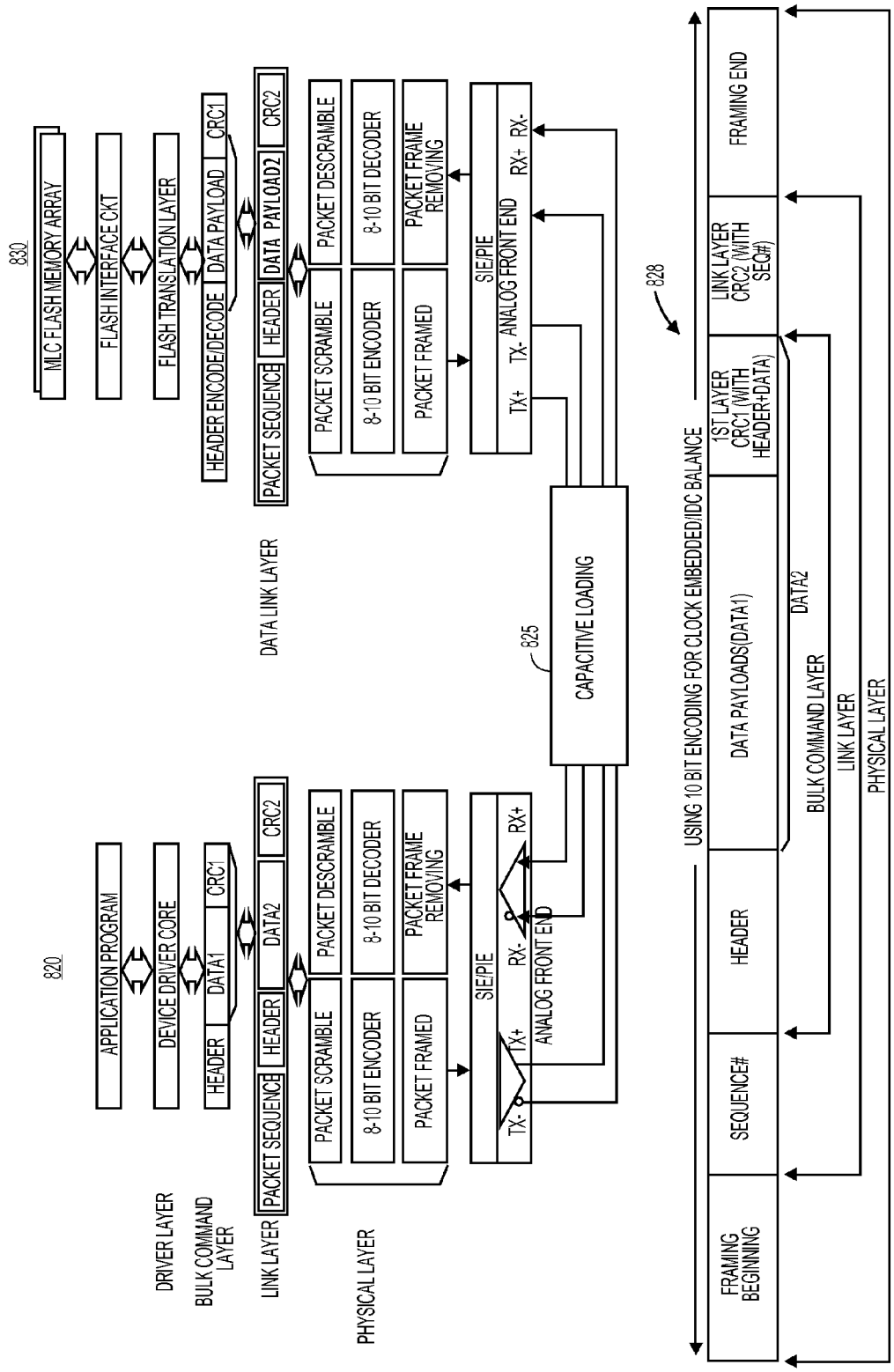

FIG. 8D is a block diagram illustrating packet forms used by an EUSB communication stack according to one embodiment of the invention. Referring to FIG. 8D, host 820 is communicatively coupled to an EUSB device 830 via an EUSB link 825, where the EUSB device 830 may be an EUSB endpoint device or an EUSB hub device. Both host 820 and EUSB device 830 include a communication stack similar to communication stack 840 of FIG. 8A, including an application layer, driver layer, a bulk command layer, data link layer, and a physical layer. An inbound physical layer includes a packet frame moving unit, 8/10 bit decoder, and a packet descrambler. An outbound physical layer includes a packet scrambler, 8/10 bit encoder, and a packet frame constructor. An example of an EUSB packet is shown as packet 828. The 8/10 bit conversion is used to balance logical zero and one within EUSB signals in an attempt to reduce DC (direct current) components of the signals, which leads to lower signal distortion.

Figure 9A:
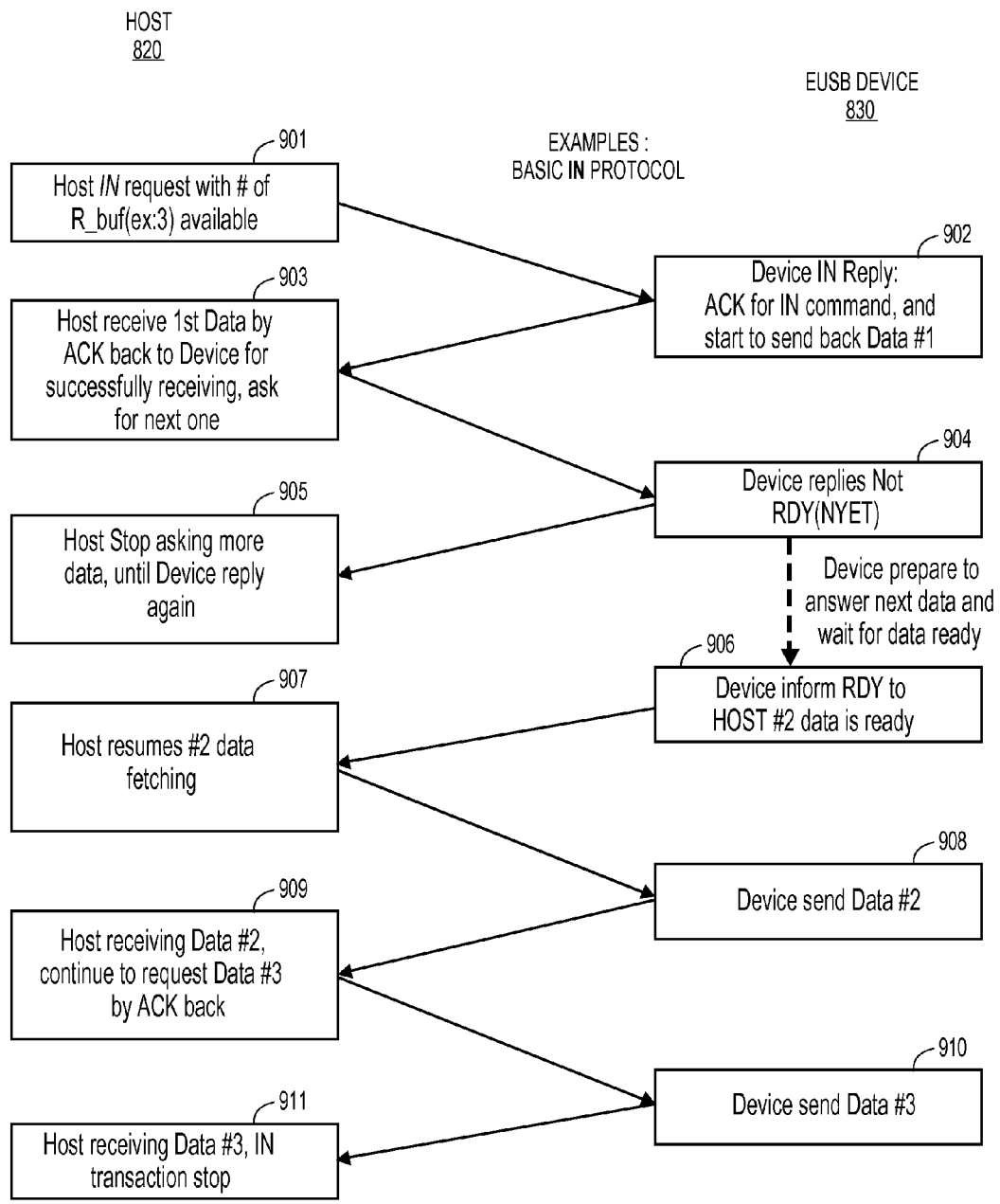
FIGS. 9A-9F are diagrams illustrating examples of communication protocols used with an EUSB system according to certain embodiments of the invention.

FIG. 9A is a flow diagram illustrating a process for an inbound transaction protocol according to one embodiment. Referring to FIG. 9A, at block 901, host 820 sends a request to USB device 830 for data by indicating the size of a receiving buffer available for receiving data. In response, at block 902, USB device 830 acknowledges the request and sends a first chunk of data to the host. At block 903, the host acknowledges the reception of the first chunk data. However, the USB device may not be ready for sending a next chunk of data. As a result, at block 904, USB device 830 sends a not ready command (e.g., NYET) to the host, which may suspend asking for more data at block 905. Subsequently, when the USB device 830 is ready, at block 906, the USB device sends a ready command to the host and in response, the host requests for a next block of data at block 907. In response to the request, at block 908, the USB device sends a next block of data, and so on during blocks 909-911.

Figure 9B:
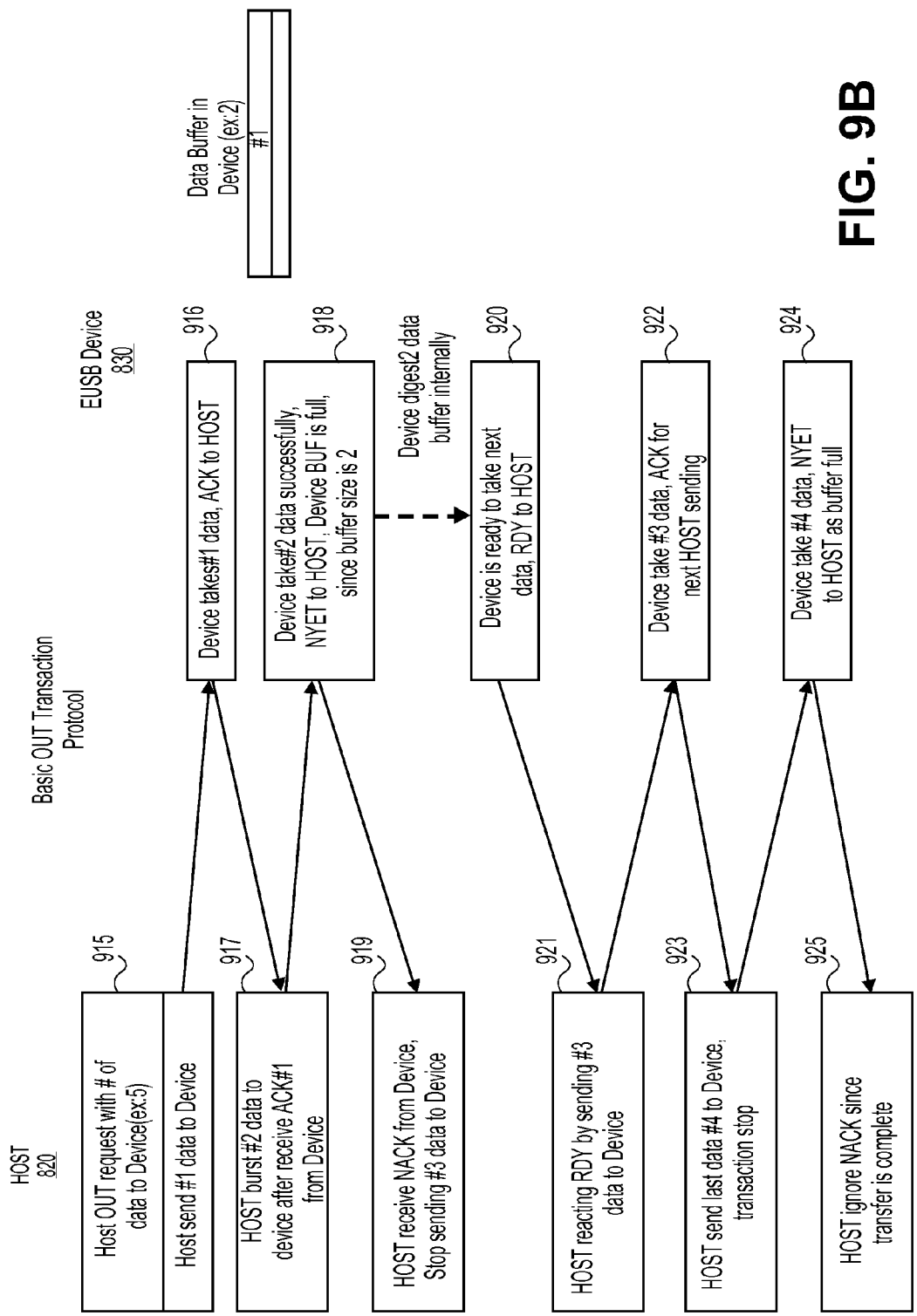

FIG. 9B is a flow diagram illustrating a process for an outbound transaction protocol according to one embodiment. Referring to FIG. 9B, after host 820 requests to sending amount of data to EUSB device 830, at block 915, the host sends a first block of data to the USB device, which at block 916, the USB device acknowledges the reception of the data. At block 917, the host sends a second block of data to the USBG device. However, the USB device is not ready to receive further data at the moment and instead, at block 918, the USB device notifies the host that its receiving buffer is full. In response, at block 919, the host suspends sending further data to the USB device. Subsequently, when the USB device is ready, at block 920, the USB device sends a signal indicating that the USB device is ready to receive further data and in response, at block 921, the host starts sending further data to the USB device, which is received by the USB device at block 922. At last, the host sends the last block of data to the USB device at block 923 and at block 914, the USB device may signal the host that the USB device is busy by sending a NYET command. However, at block 925, the host may ignore such a command since there is no more data to be sent.

Figure 9C:
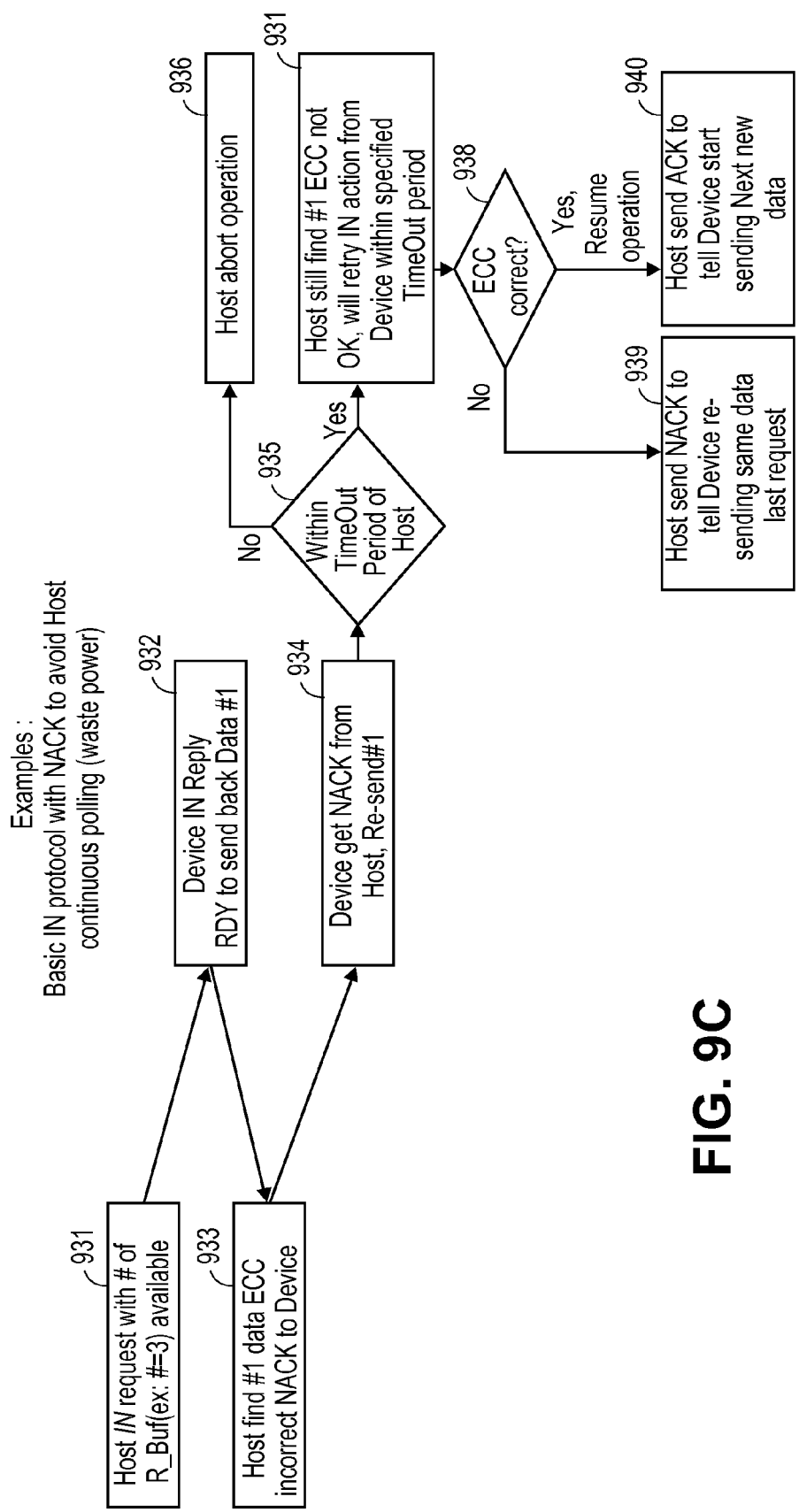

FIG. 9C is a block diagram illustrating a process for an inbound transaction protocol according to an alternative embodiment. Referring to FIG. 9C, at block 931, the host sends a request for receiving data from a USB device including indicating an availability of a receiving buffer. In response, at block 932, the USB device replies with a first block of data. In response to the data received from the USB device, at block 933, the host examines the integrity of the data packets (e.g., examination of error correction code or ECC) and in this example, an error exists. The host responds with a negative acknowledgment (NACK) to the USB device, which is received by the USB device at block 934. At block 935, the host checks whether it has been a while that the host has not received any further data by comparing against a predetermined host timeout period. If it exceeds the timeout period, at block 936, the host abandons the operations. Otherwise, at block 937, the host may retries the NACK message to the USB device. At block 938, if the subsequent data received has a correct ECC data, at block 940, the host acknowledges the USB device for further data. Otherwise, at block 939, the host responds with a NACK to ask the USB device to resend the same data.

Figure 9D:
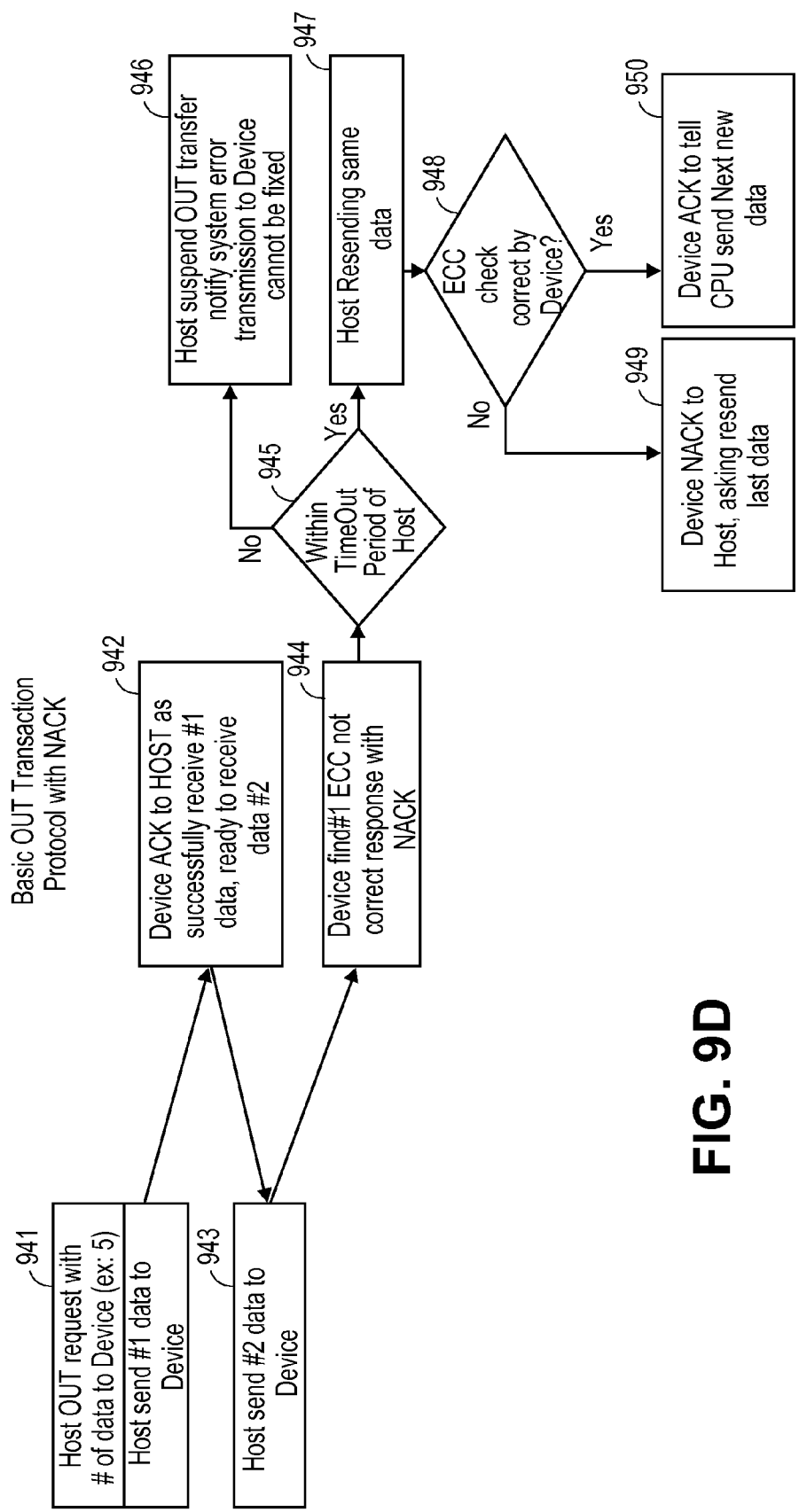
Figure 9E:
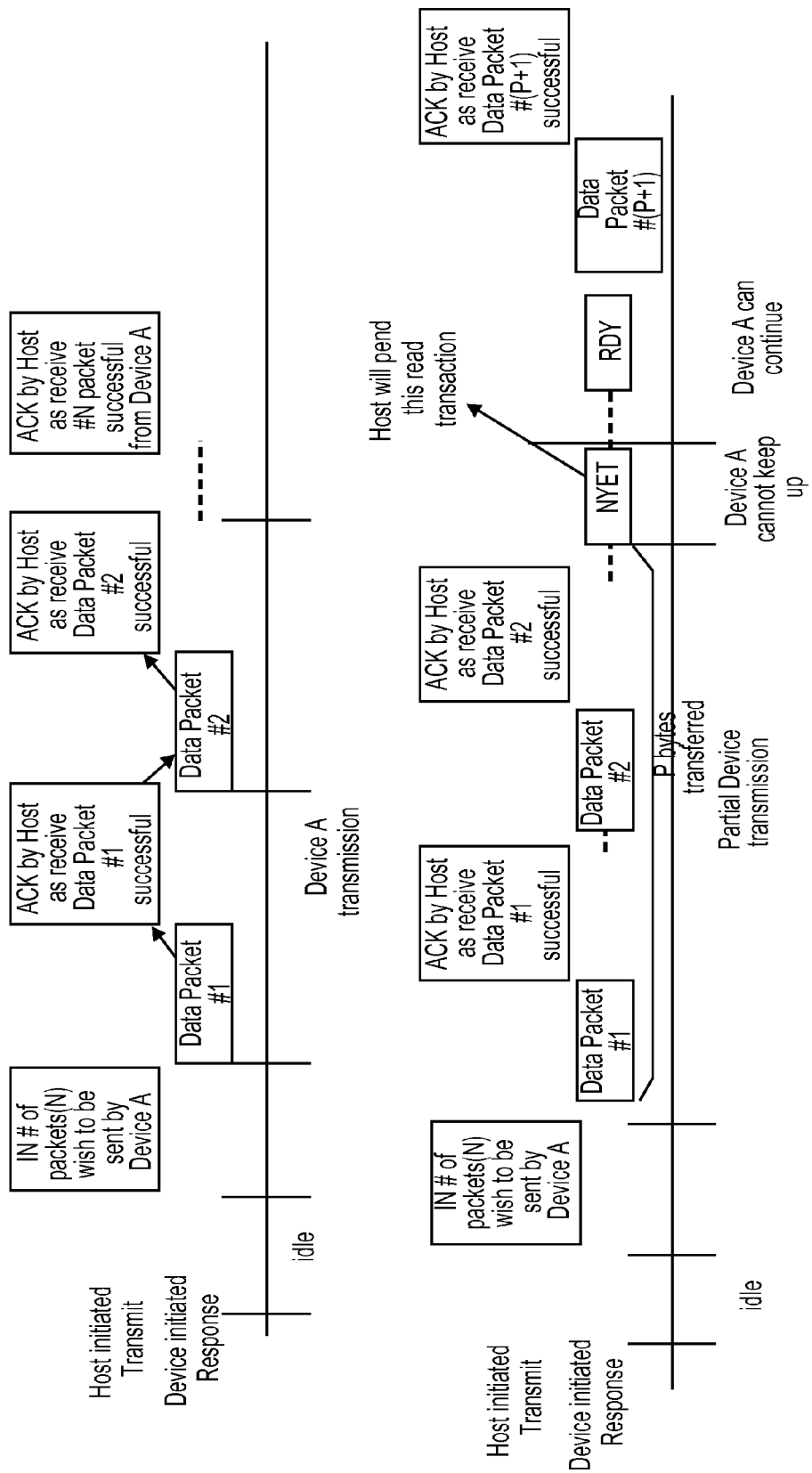
Figure 9E:
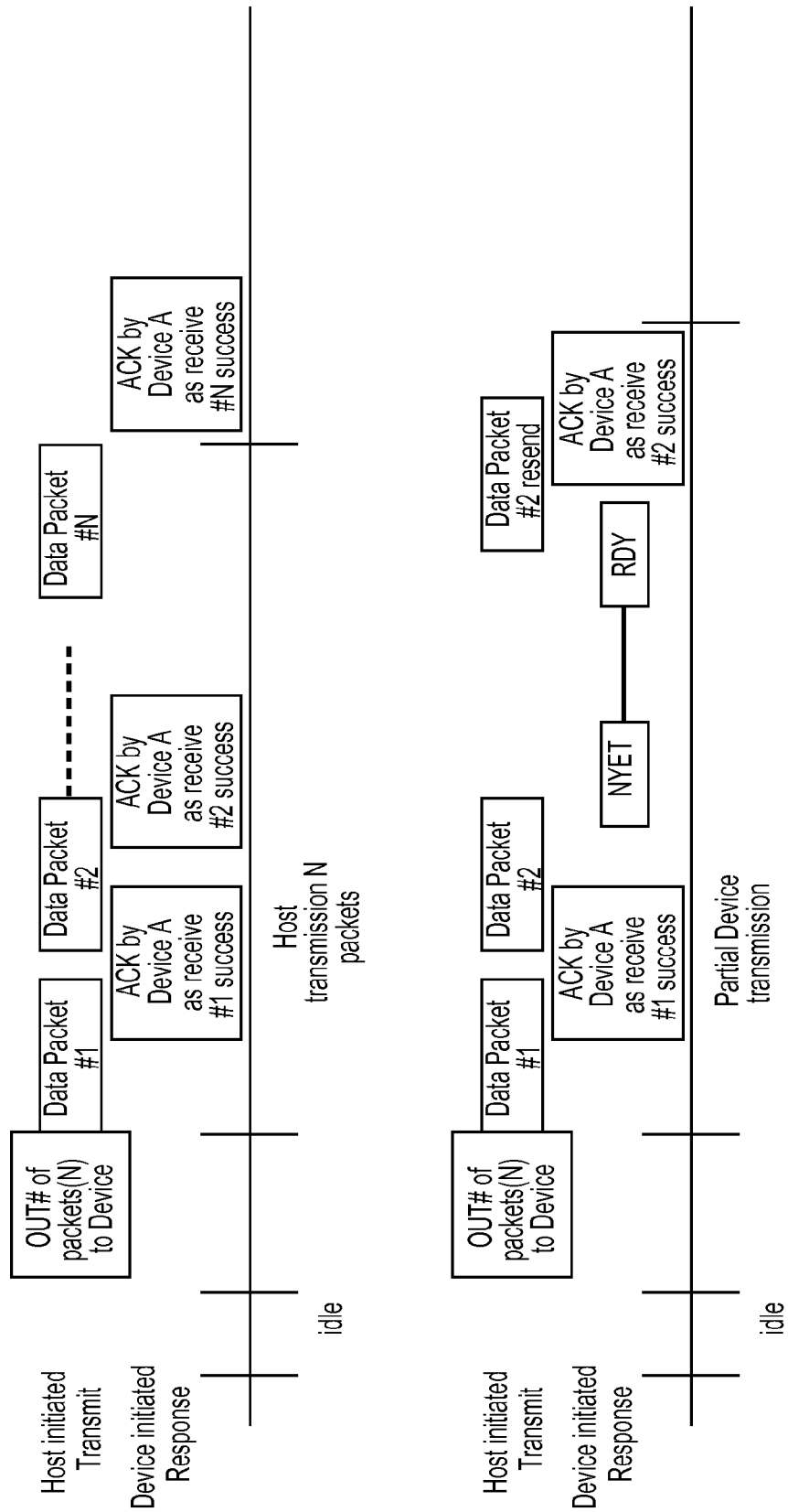
Figure 9E:
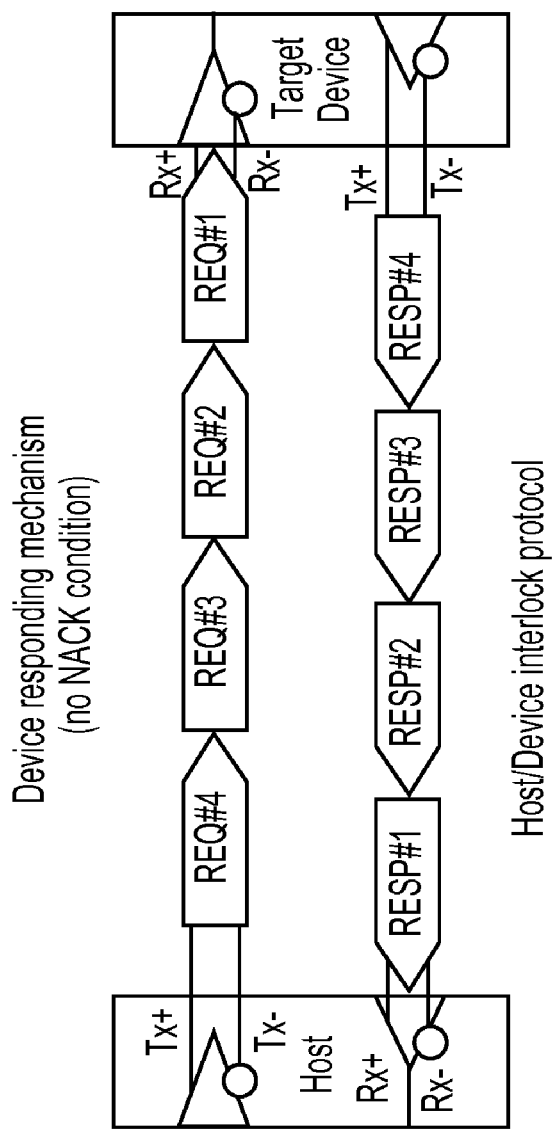

FIG. 9D is a block diagram illustrating a process for an outbound transaction protocol according to an alternative embodiment. Referring to FIG. 9D, at block 941, the host requests sending predetermined amount of data to the USB device and starts sending a first block of data, which is received by the USB device at block 942. Subsequently, at block 943, the host sends further data to the USB device, which at block 944, the USB device determines that the ECC is incorrect and thus sends a NACK back to the host. At block 945, the timeout is checked and if it is timed out, at block 946, the host suspends sending data out. If it is still within the timeout period, the host resends the same data at block 947 and ECC is checked at block 948. If the ECC is incorrect, at block 949, an NACK is sent back to the host; otherwise, at block 950, an ACK is sent to the host. FIG. 9E is a timeline diagram illustrating certain states with respect to operations involved in FIGS. 9A-9D.

Figure 9F:
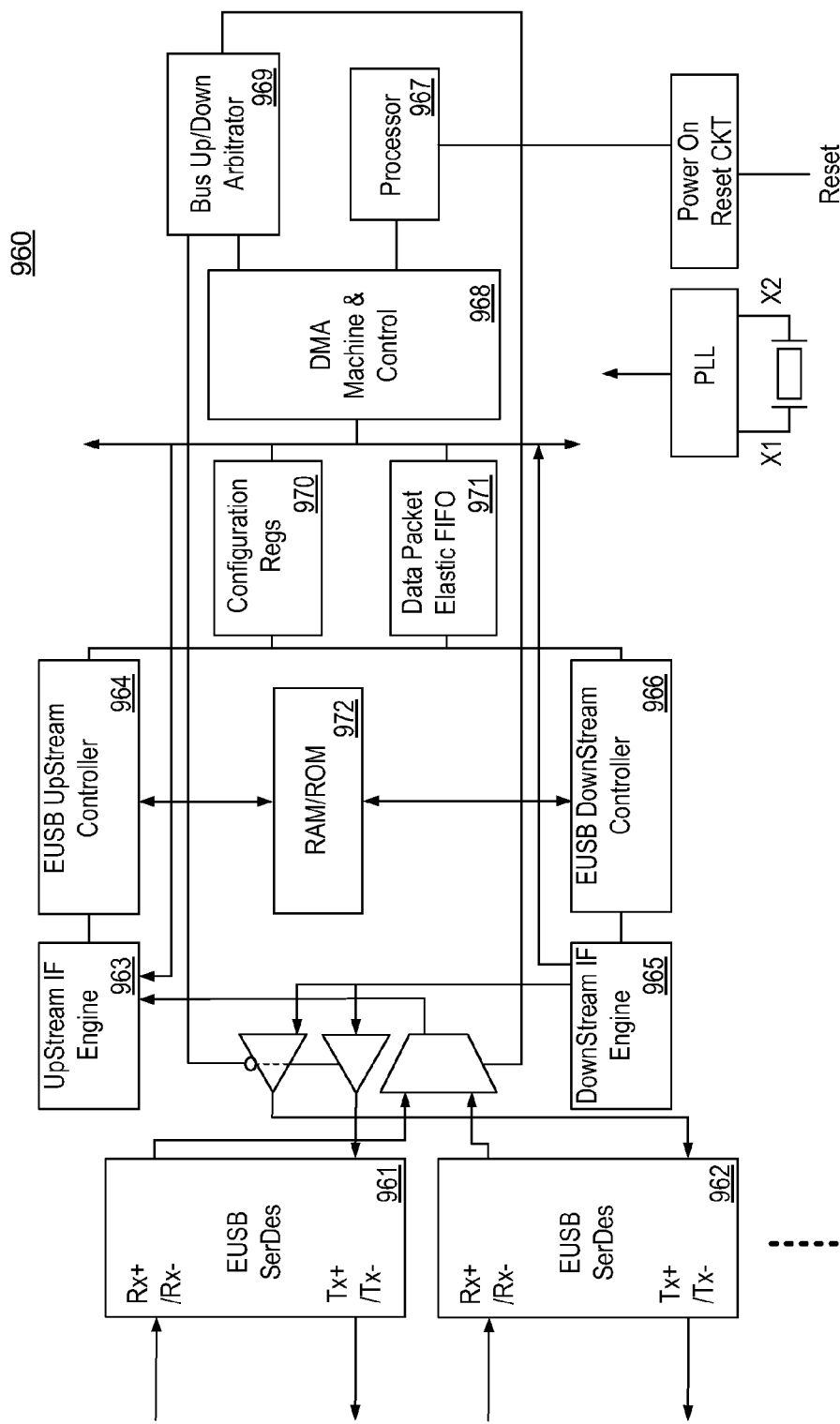

FIG. 9F is a block diagram illustrating an example of a system having EUSB capabilities according to one embodiment of the invention. Referring to FIG. 9F, system 960 includes one or more EUSB bus interfaces 961-962. System 960 further includes an upstream path having upstream interface engine 963 and an upstream controller 964. Similarly, system 960 includes a downstream path having a downstream engine 965 and a downstream controller 966. Upstream interface engine 963 and downstream interface engine 965 are used to handle EUSB protocols for the upstream and downstream paths respectively. Likewise, upstream controller 964 and downstream controller 966 are used to perform certain task associated with the EUSB protocols based on executable instructions stored in memory 972 which may be a RAM or ROM. System 960 further includes a processor 967 for general-purpose operations and a DMA (direct memory access) engine 968 for moving data without having to involve processor 967. Bus arbitrator 969 is used to arbitrate an ownership of EUSB bus for the upstream path and/or downstream path. System 960 further includes a set of configuration registers for configuring operations of the EUSB bus and a FIFO buffer for buffering the data. Note that some or all components as shown in FIG. 9F may be implemented in software, hardware, or a combination of both.

FIG. 10 is a table showing signal multiplexing with a 9-pin SD connector. Power (VDD) is provided on pin 4, while grounds are provided on pins 3 and 6. A clock is input to the card on pin 5, while pin 7 is a serial data I/O DAT0 for all interfaces.

Pin 2 is a bi-directional command CMD line for MMC, SD, and USB interfaces, and is a data input DIN for SPI (Serial Peripheral Interface), which is a full-duplex, synchronous, serial data link standard across many microprocessors, microcontrollers, and peripherals. SPI enables communication between microprocessors and peripherals and/or inter-processor communication. SPI mode is a subset of the MultiMediaCard and SD protocols. The SPI interface has a chip-select on pin 1 and a data-output to the host on pin 7. The SPI and MMC interfaces do not use pins 8, 9.

For the SD interface, up to four data lines may be used at a time, although only one data line may be used during a particular communication session (e.g., during card initialization). Data line DAT0 is on pin 7, DAT1 on pin 8, DAT2 on pin 9, and DAT3 on pin 1.

When VSD mode is active and the USB protocol is selected, serial USB data is transferred bi-directionally over the USB differential data lines D+, D−. The CMD, CLK, and DAT0 lines can still be connected to the SD processor, allowing 1-bit SD communication when USB capability is not available.

When ESD mode is active and the PCIE protocol is selected, serial PCI data is transferred over two pairs of differential data lines (i.e., transmit lines Tp0 and Tn0, and lines and receive lines Rp0 and Rn0). Transmit lines Tp0, Tn0 on pins 2, 1 are output by the card and received by the host, while receive lines Rp0, Rn0 on pins 8, 9 are output by the host and received by the card.

When ESD mode is active and the eSATA protocol is selected, serial ATA data is transferred over two pairs of differential data lines (i.e., "A" lines A+ and A−, and "B" lines B+ and B−). A lines A+ and A− on pins 2 and 1, respectively, are output by the host and received by the card, while B lines B+ and B− on pins 8 and 9, respectively, are output by the card and received by the host. SD communication stops while eSATA is being used.

When ESD mode is active and the Firewire protocol is selected, serial IEEE-1394 data is transferred over two pairs of differential data lines (i.e., transmit-pair-A lines TPA and TPA* and transmit-pair-B lines TPB and TPB*). Transmit-pair-A lines TPA and TPA* on pins 2 and 1, respectively, are output by the card and received by the host, while transmit-pair-B lines TPB and TPB* on pins 8 and 9, respectively, are output by the host and received by the card. SD communication stops while IEEE-1394 is being used.

FIG. 11 is a table showing signal multiplexing with a 7-pin MMC connector. Older legacy hosts may support only MMC. USB, SD, SPI, and MMC are supported, but not other interfaces such as SATA, IEEE-1394, and PCIE. Although there are 6 MMC signal pins, the MMC interface has an extra, unused pin, for a 7-pin physical interface. Power (VDD) is provided on pin 4, while grounds are provided on pins 3 and 6. A clock is input to the card on line 5, while pin 7 is a serial data I/O DAT0 for all interfaces.

Pin 2 is a bi-directional command CMD line for MMC, SD, and USB interfaces, and is a data input DIN for SPI. The SPI interface has a chip-select on pin 1 and a data-output to the host on pin 7. The SD interface uses data line DAT0 on pin 7.

When ESD mode is active and the USB protocol selected, serial USB data is transferred bidirectionally over the USB differential data lines D+, D− on pins 2, 1. Thus USB can still be supported when only 7 pins are available.

FIG. 12A is a table showing pin multiplexing for an extended 13-pin connector. Pins 10-13 are used as data pins DAT4:7 on an extended SD interface, and can also be reserved for the serial-bus interfaces for the version 4.0 MMC specification FIG. 12B is a table showing pin multiplexing for a 10-pin Memory Stick system. Rather than use SD, the extended interface could be designed for other card base-protocols, such as Memory Stick (MS). Memory Stick has a 10-pin connector, with power on pins 3 and 9, and ground on pins 1 and 10. Pin 8 is a system clock (SCLK) input, while pin 2 is a bus-state (BS) input. Data is carried bidirectionally by DAT0 on pin 4, while pin 6 is an insertion (INS) pin that can be pulled up by a resistor on the MS card to indicate that the card has been inserted.

Pins 5 and 7 are reserved for MS, but are used by an extension known as MS Pro Duo. MS Pro Duo has a 4-bit data bus, DAT0:3, using pins 4, 3, 5, 7, respectively. One less power is available for MS Pro Duo, since pin 3 is used for DAT1 rather than VCC.

For a MS-USB extended mode, pins 4, 3 carry the USB differential data pair D+, D−. Other pins can be used for MS or MS Pro Duo signaling. For PCIE extended mode, pins 4, 3 carry the PCI transmit differential data pair T+, T−, while pins 7, 5 carry the PCI receive differential data pair, R+, R−. Likewise, for SATA extended mode, pins 4, 3 carry the eSATA transmit differential data pair T+, T−, while pins 7, 5 carry the eSATA receive differential data pair, R+, R−. For IEEE 1394 extended mode, pins 4, 3 carry the 1394 A differential data pair TPA, TPA*, while pins 7, 5 carry the 1394 B differential data pair, TPB, TPB*.

Note that for the physical construction of the cards themselves, a variety of materials may be used for the card substrate, circuit boards, metal contacts, card case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes.

Many extended protocols such as PCI-Express, USB, serial ATA, Serial Attached SCSI, or Firewire IEEE 1394 can be used as a second interface. The host may support various serial-bus interfaces, and can first test for USB operation, then IEEE 1394, then eSATA, then SA SCSI, etc, and later switch to a higher-speed interface such as PCI-Express.

Note further that while an SD card has generally been described for exemplary purposes, the SD card could be replaced by a Memory Stick (MS) card, a MS Pro card, a MS Duo card, a Mini-SD card, a reduced-size MMC card, etc. A hardware switch could replace some of the card-detection routine steps. For example, a notch could be added to the card housing to interface with a switch in the card socket.

In addition, a special LED can be designed to inform the user which electrical interface is currently in use. For example, if the standard SD interface is in use, then this LED can be turned on. Otherwise, this LED is off. If more than 2 modes exist, then a multi-color LED can be used to specify the mode, such as green for PCI-Express and yellow for USB.

Also, different power-supply voltages may be used. USB and eSATA may use a 5-volt supply, while SD and MMC use a 3.3-volt supply, and PCIE uses a 1.5-volt supply. A 3.3-volt supply could be applied to the VCC pin, and an internal voltage converter on the ESD card could generate other voltages, such as 5 volts using a charge pump, and 1.5 volts using a DC-to-DC converter.

PCI Express system bus management functions can be achieved by the two differential pairs of the ESD/PCIE interface. Clock signals such as REFCLK+ and REFCLK− are signals that can be added using additional pads. The side band signals of PCIE can be added, such as CPPE#, CPUSB#, CLKREQ#, PERST#, WAKE#, +3.3AUX, SMBDATA, SMBCLK, etc. with additional pads. Also, the approach of using modified PCIE signals can be applied to the design of serially-buffered memory modules of DRAMs.

In light of the above description of a multi-personality flash memory card, it can be seen that the limitations of conventional card-based communications protocols (e.g., SD, MMC, CF) can be overcome by incorporating a second standard communications protocol capability, such as USB, eSATA, Firewire, or PCI-Express. However, according to another embodiment, a flash memory card and/or a host controller can include card-specific differential data transfer logic for enabling differential data transfer between the flash memory card and a host device. Similarly, FIG. 12C shows a pin mapping table for Micro-SD form factor.

Figure 13A:
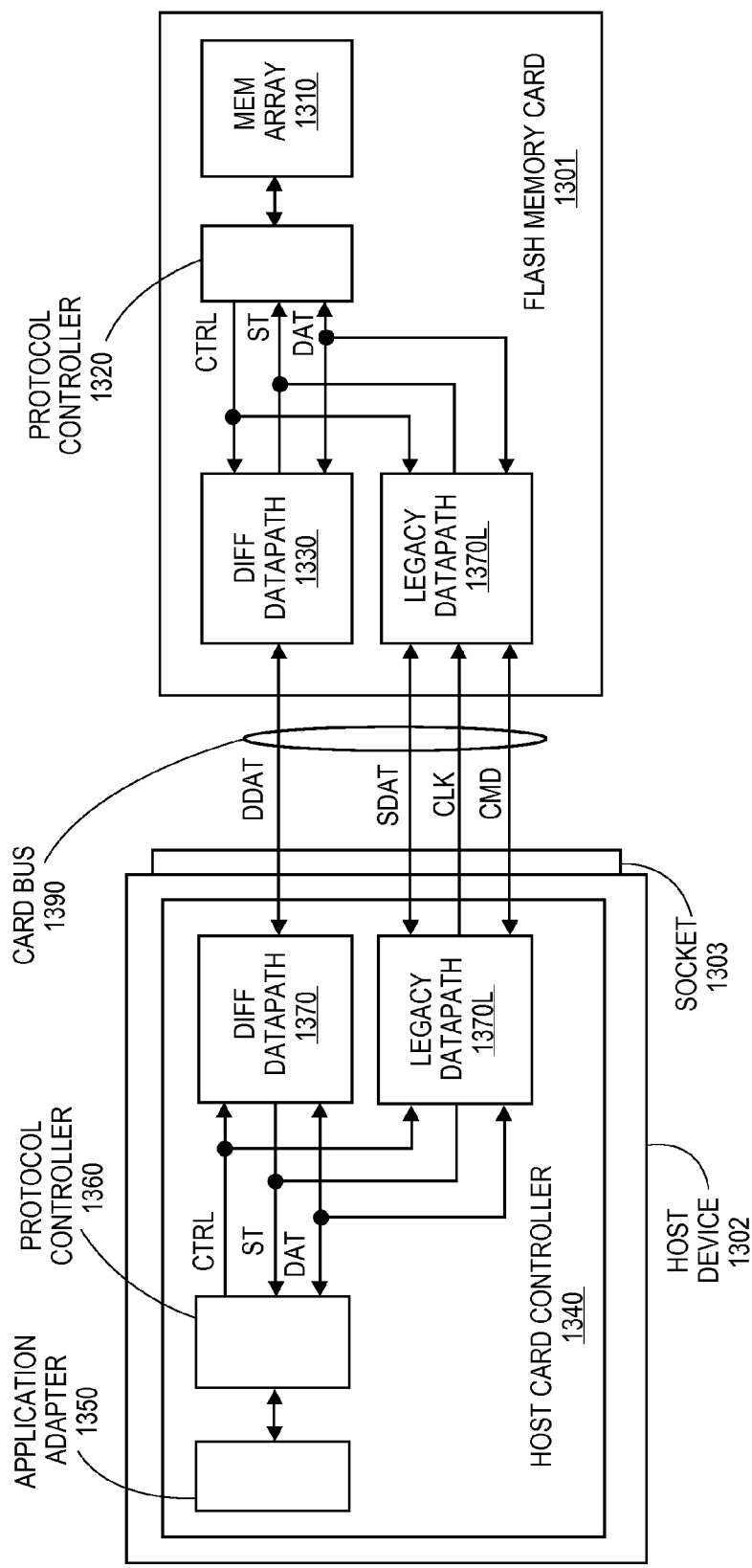
FIG. 13A is a schematic diagram of embodiments of a host device and flash memory card with differential data transfer capabilities.

For example, FIG. 13A shows embodiments of a host device 1302 and a flash memory card 1301 that can communicate via a differential signal DDAT. Host device 1302 can be any type of electronic device that interfaces with a flash memory card, such as a digital camera, an MP3 player, or a voice recorder, among others. Flash memory card 1301 can comprise any type of flash memory card, including an MMC card, an SD card, a Memory Stick, or a CF card. Note that while communication between flash memory card 1301 and host device 1302 occurs when flash memory card 1301 is inserted into a socket 1303 of host device 1302 (or when flash memory card 1301 is coupled to socket 1303 by an adapter or extension), for explanatory purposes and clarity, flash memory card 1301 is depicted apart from host device 1302.

Flash memory card 1301 includes a memory array 1310, a protocol controller 1320, a differential datapath 1330, and an optional legacy datapath 1330L. Host device 1302 includes a host card controller 1340 that includes an application adapter 1350, a protocol controller 1360, a differential datapath 1370, and an optional legacy datapath 1370L. Differential datapaths 1330 and 1370 can provide the same basic functionality for flash memory card 1301 and host card controller 1340, respectively, by converting card-specific protocol signals (e.g., control signals CTRL, status signals ST, and data signals DAT from protocol controllers 1320 and 1360), into differential signal(s) DDAT that can be transmitted between flash memory card 1301 and host card controller 1340 across a card bus 1390.

Figure 1A:
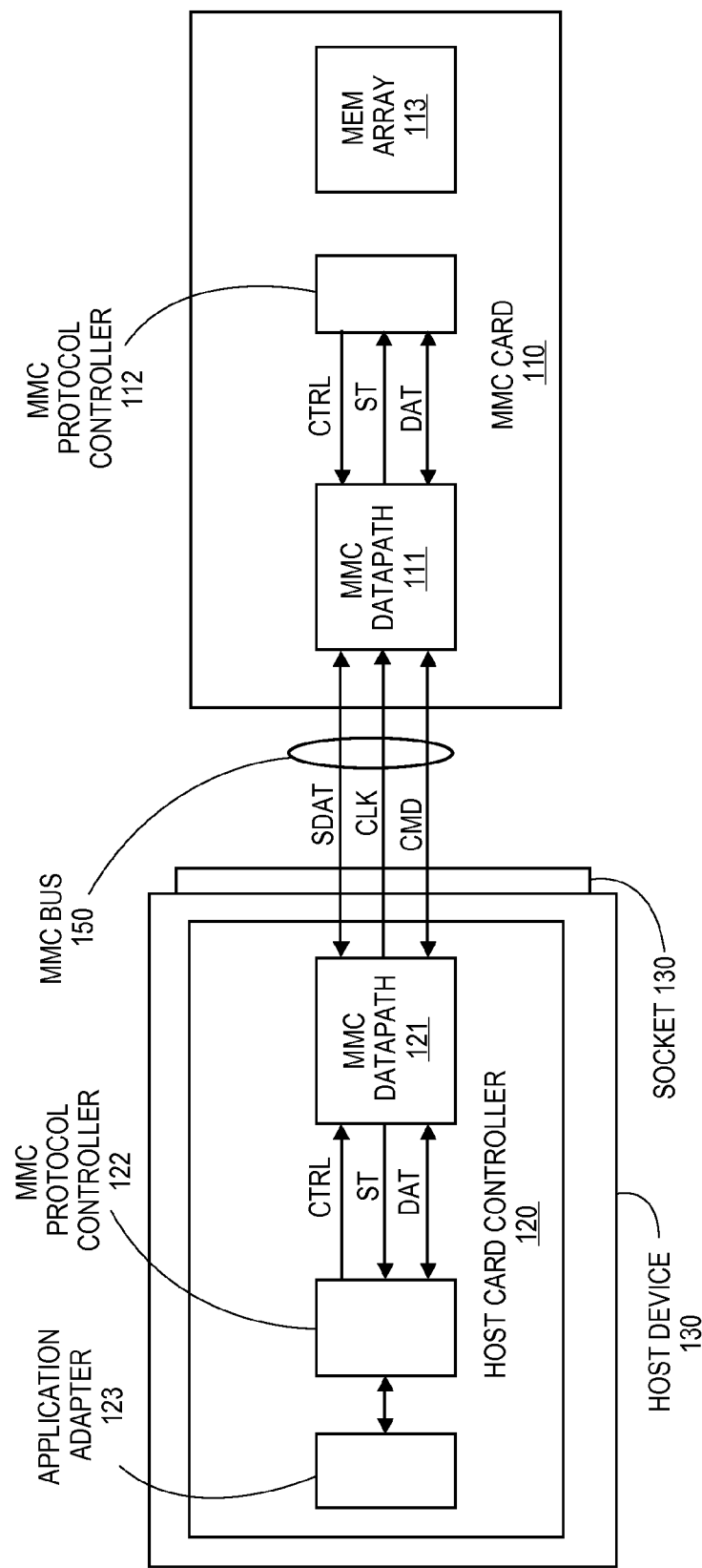
FIGS. 1A-1C are diagrams illustrating certain MMC system configurations.

Like conventional MMC datapaths 111 and 121 shown FIG. 1A, differential datapaths 1330 and 1370 can provide serial-to-parallel conversion for incoming data and parallel-to-serial conversion for outgoing data, frame detection to ensure proper read/write operations of memory array 113, and error checking (typically CRC checking of signals SDAT and CMD). However, differential datapaths 1330 and 1370 also provide differential data encoding and decoding to enable differential data communications between flash memory card 1301 and host card controller 1340.

Meanwhile, protocol controllers 1320 and 1360 in flash memory card 1301 and host card controller 1340, respectively, can operate in much the same manner as MMC protocol controllers 112 and 122, respectively, shown in FIG. 1A. Specifically, protocol controller 1320 in flash memory card 1301 performs appropriate actions (e.g., read/write operations to memory array 1330 and processing of checksum errors detected by differential datapath 1310) in response to incoming status signals ST and data signals DAT, and generating appropriate outgoing control signals CTRL and data signals DAT (e.g., read/write pass/fail indicators and data) upon completion of those actions.

Similarly, protocol controller 1360 in host card controller 1340 generates appropriate outgoing control signals CTRL and data signals DAT (e.g., read/write command and memory addresses) in response to instructions from application adapter 1350, and performs appropriate actions (e.g., providing read data or write operation confirmation) in response to incoming status signals ST and data signals DAT. Note that data signal DAT and status signal ST can be provided directly to host device 1302 by protocol controller 1360, or can be converted from the card-specific communications protocol to a host-specific communications protocol by application adapter 1350. Just as described with respect to application adapter 123 in FIG. 1A, application adapter 1350 acts as a bridge between host-specific communications and card-specific communications.

Communications between flash memory card 1301 and host device 1302 are initiated by the insertion of flash memory card 1301 into socket 1303, which activates flash memory card 1301. Application adapter 1350 can then apply a command from host device 1302 (e.g., a read or write command) to protocol controller 1360, which then provides an appropriate control signal CTRL and data signal DAT to differential datapath 1370. Differential datapath 1370 then converts signals CTRL and DAT into a differential signal DDAT that is transmitted to differential data path 1330 of flash memory card 1301. Differential data path 1330 decodes data signal DDAT into a status signal ST and data signal DAT, which cause protocol controller 1320 to perform the requested operation on memory array 1310 (unless differential datapath 1330 indicates a failed transmission). Protocol controller 1320 returns a response and any associated data from memory array 1310 to differential datapath 1330 via a control signal CTRL and a data signal DAT. Differential datapath 1330 converts signals CTRL and DAT into a differential signal DDAT that is transmitted back to differential datapath 1370 in host card controller 1340. Differential datapath 1370 then decodes the incoming differential data signal DDAT into a status signal ST and a data signal DAT, which can then be converted to appropriate host-specific signals for use by host device 1302.

Figure 13B:
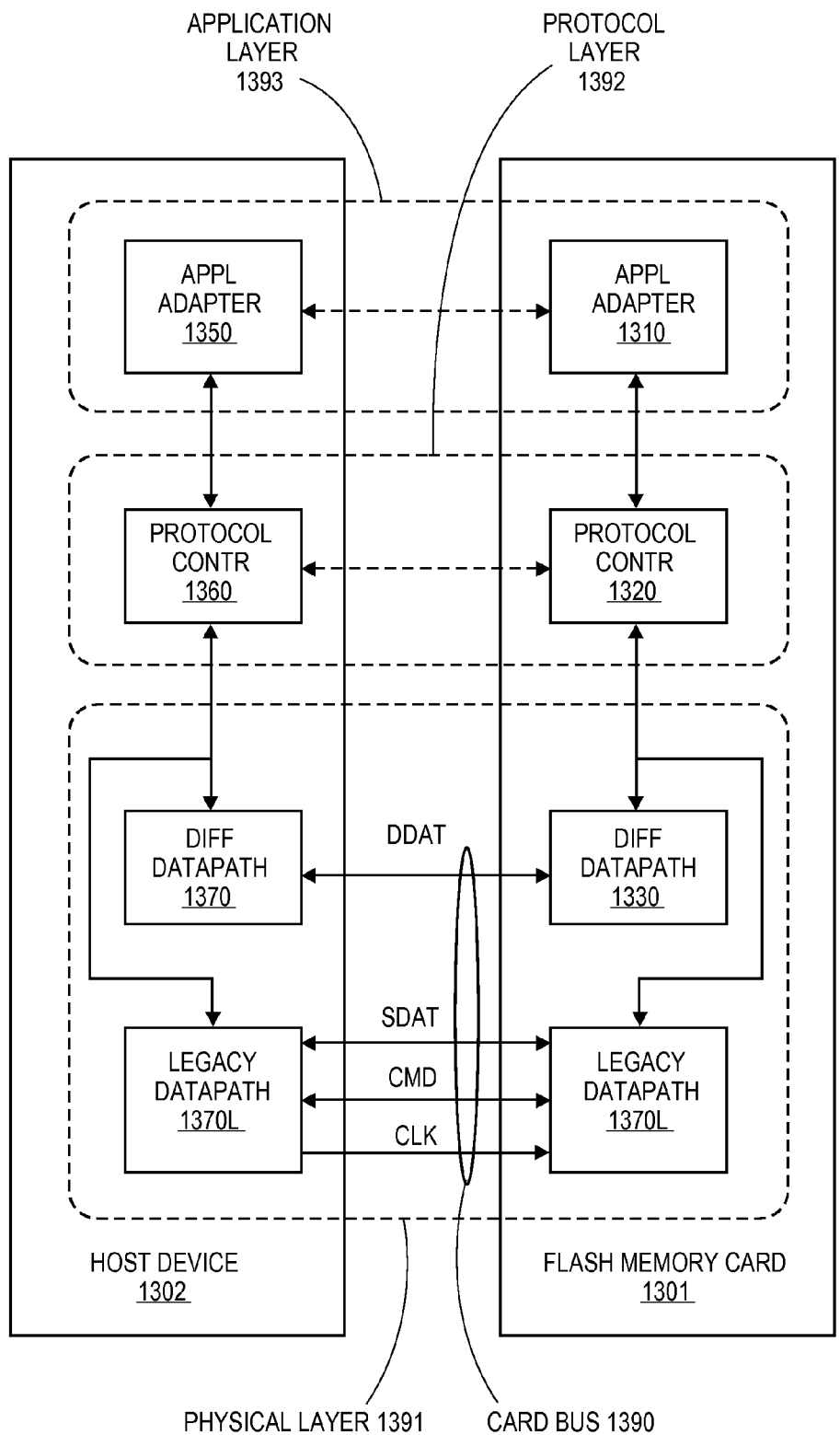
FIG. 13B is an embodiment of a communication diagram for a differential data transfer-enabled host device and flash memory card.

Communications between flash memory card 1301 and host device 1302 can be thought of as a layered transaction, with information being passed across the different layers at varying levels of abstraction. For example, FIG. 13B shows an exemplary communications diagram for flash memory card 1301 and host device 1302 that indicates the various layers making of the communications stack. Protocol layer 1392 and application layer 1393 are virtual connections (indicated by the dotted arrows) between host device 1302 and flash memory card 1301. At application layer 1393, application adapter 1350 of host device 1302 accesses flash memory array 1310 of flash memory card 1310. This top-level transaction is made possible by protocol layer 1392, in which application-specific communications are translated into card-specific communications across protocol controllers 1320 and 1360. The protocol layer communications are implemented in a physical layer 1301, in which actual signals (i.e., differential signal DDAT and optional legacy signals SDAT, CMD, and CLK) are transmitted between host device 1302 and flash memory card 1301 over card bus 1390.

Note that differential data transfer capabilities for host device 1302 and flash memory card 1301 can be implemented in physical layer 1391, thereby allowing any card protocol to be used in the implementation of protocol controllers 1360 and 1320, respectively. For example, in one embodiment, protocol controllers 1360 and 1320 could comprise standard MMC protocol controllers that make use of standard MMC-specific protocol signals (e.g., signals CTRL, ST, and DAT). In various other embodiments, protocol controllers 1320 and 1360 could comprise standard SD, Memory Stick, or CF protocol controllers for generating, and operating in response to, standard SD-specific, Memory Stick-specific, or CF-specific, respectively, protocol signals. The use of conventional flash memory card-specific protocol controllers can beneficially simplify the implementation of high-speed differential communications.

For example, a conventional host device configured for conventional clocked data communications with a MMC card could be reconfigured for differential data communication simply by replacing the existing the standard MMC datapath with a differential datapath (e.g., replacing MMC datapath 121 in FIG. 1A with differential datapath 1370). If the MMC datapath is implemented in firmware (or some other reprogrammable form), the change becomes as easy as updating the firmware to implement the differential datapath.

Note also that the use of a standard card-specific protocol controller (e.g., an MMC protocol controller or an SD protocol controller) can allow host card controller 1340 and/or flash memory card 1301 to selectably perform differential data transfers and clocked data transfers, depending on the characteristics of the interfacing device/card. For example, protocol controller 1360 could comprise a standard MMC protocol controller coupled to both differential datapath 1370 and legacy datapath 1370L. Legacy datapath 1370L could then be a standard MMC datapath that communicates via standard clocked command signals CMD and serial data signals SDAT. In this manner, host card controller 1340 could communicate with conventional MMC cards using conventional clocked data transfer, but could also use the higher-speed, lower-power differential data transfer when communicating with differential data-enabled MMC cards.

Similarly, protocol controller 1320 in flash memory card 1301 could comprise a conventional MMC protocol controller coupled to both differential datapath 1330 and legacy datapath 1330L, in which case legacy datapath 1330L could comprise a conventional MMC datapath. In this manner, flash memory card 1301 could communicate with conventional MMC-based host devices using standard clocked data transfer, while switching to higher-speed, lower-power differential data transfer when communicating with differential data-enabled host devices.

Figure 14B:
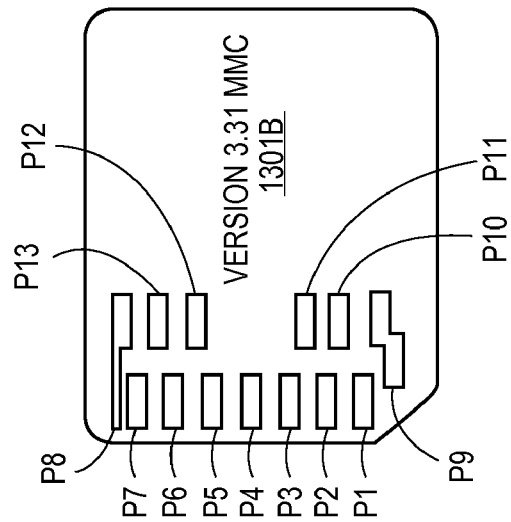
FIGS. 14A-14E are sample pin layout diagrams for various types of flash memory cards that can incorporate differential data transfer capabilities.
Figure 14A:
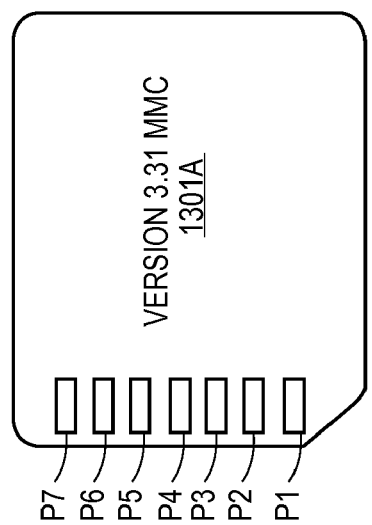

FIG. 14A shows a mechanical form factor diagram for an embodiment of a version 3.31 MMC-compatible card 1301A that provides differential data transfer capabilities. A sample pin assignment for version 3.31 MMC-compatible card 1301A is listed below in Table 3.

TABLE 3

| Pin No. | Name |
| --- | --- |
| P1 | D− |
| P2 | CMD (OPT.) |
| P3 | VSS1 |
| P4 | VDD |
| P5 | CLK (OPT.) |
| P6 | VSS2 |
| P7 | D+/DAT0 |

Figure 1B:
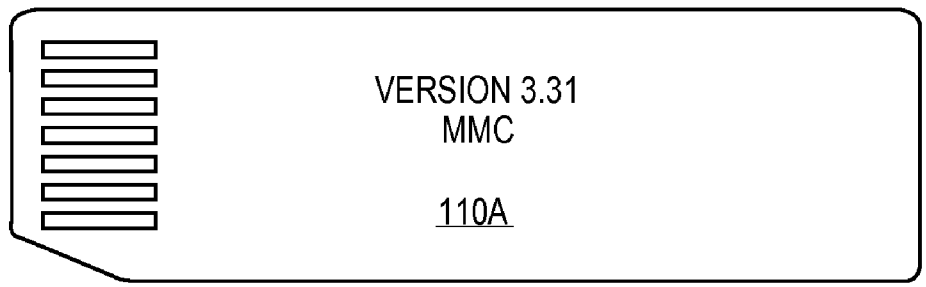
Figure 1C:
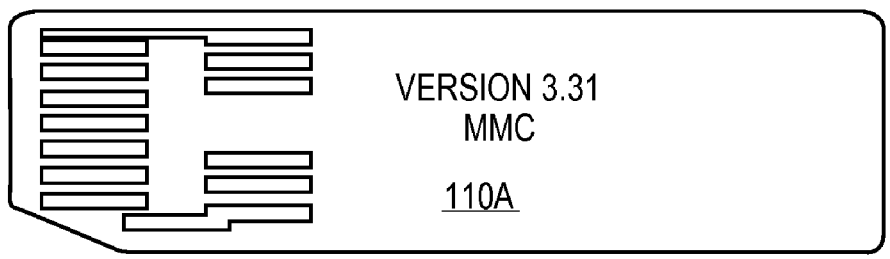
Figure 2A:
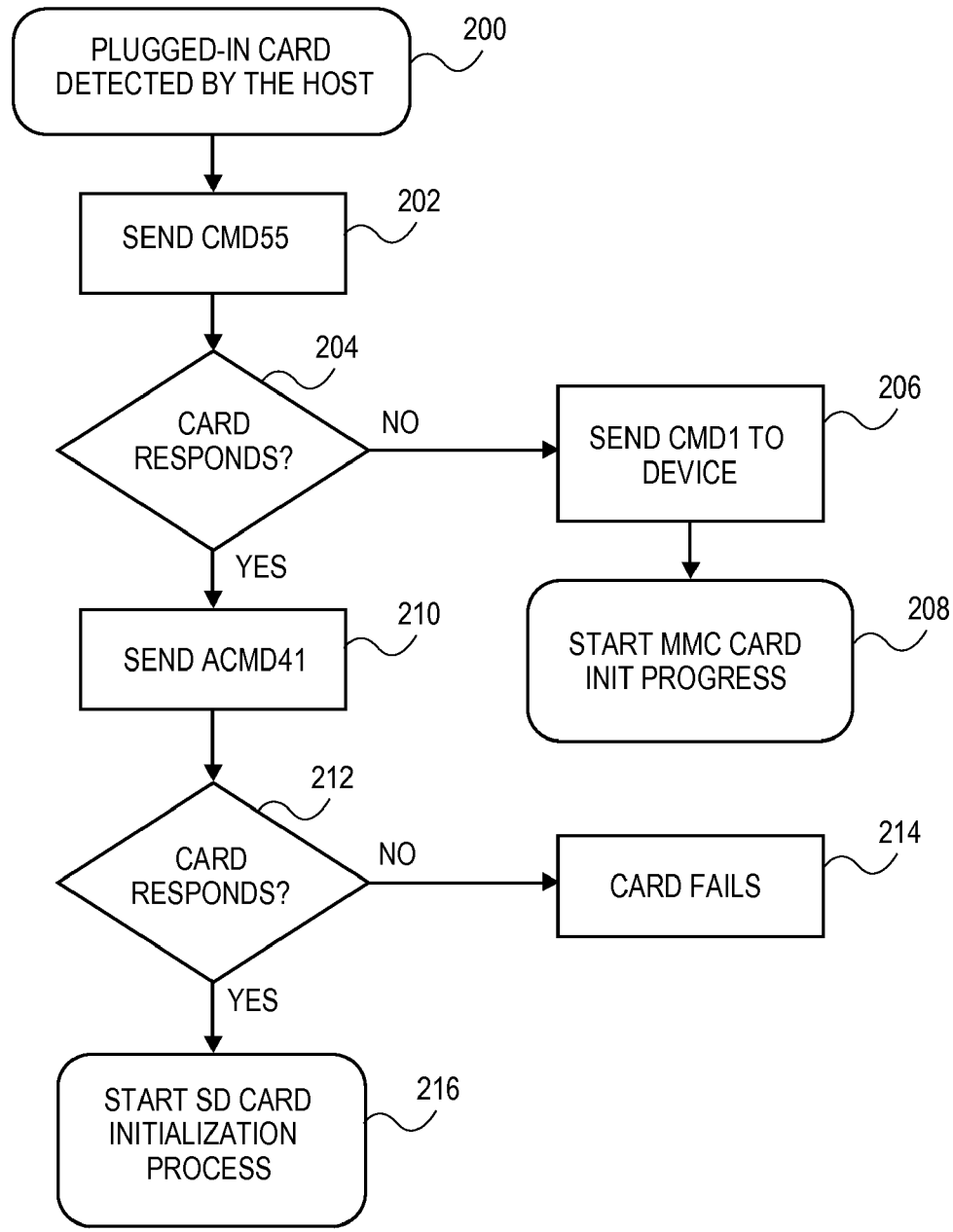
FIG. 2A shows a prior-art card-detection routine executed by a host.
Figure 2B:
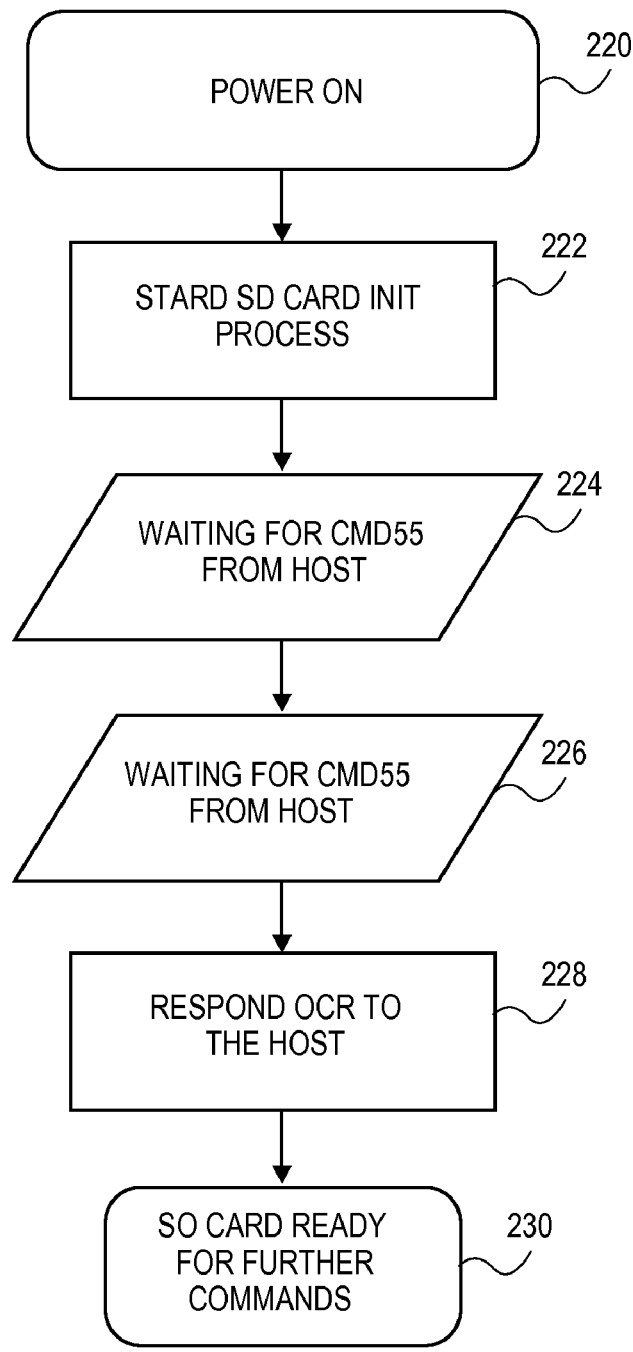
FIG. 2B is a flowchart of a prior-art detection-response routine executed by an SD card.

Card 1301A includes pins P1-P7. Just as in a conventional version 3.31 MMC card (e.g., MMC card 110A shown in FIG. 1B), pins P3, P4, and P6 are power supply pins for receiving supply voltages VSS1, VDD, and VSS2, respectively. However, rather than only using pin P7 as a data (DAT0) pin, card 1301A makes use of pins P1 and P7 to send/receive the complementary signals D− and D+, respectively, that make up a differential signal (i.e., differential signal DDAT in FIG. 13A).

If card 1301A also includes a standard MMC datapath (e.g., legacy datapath 1330L shown in FIG. 13A), pins P2, P5, and P7 can be used in the conventional manner for command signal CMD, clock signal CLK, and serial data signal DAT0 (e.g., serial data signal SDAT in FIG. 1A). Note that pin P7 would then be a dual-use pin that provides serial data signal DAT0 during clocked data transfers and differential signal component D+ during differential data transfers. In this manner, a differential data transfer-enabled MMC card can retain form factor and pinout compatibility with conventional MMC-based host devices.

FIG. 14B shows mechanical form factor diagram for an embodiment of a version 4.0 MMC-compatible card 1301B that provides differential data transfer capabilities. An exemplary pin assignment for version 4.0 MMC-compatible card 1301B is listed below in Table 4.

TABLE 4

| Pin No. | Name |
| --- | --- |
| P1 | D−/DAT3 |
| P2 | CMD (OPT.) |
| P3 | VSS1 |
| P4 | VDD |
| P5 | CLK (OPT.) |
| P6 | VSS2 |
| P7 | D+/DAT0 |
| P8 | A+/DAT1 |
| P9 | A−/DAT2 |
| P10 | B+/DAT4 |
| P11 | B−/DAT5 |
| P12 | C+/DAT6 |
| P13 | C−/DAT7 |

Card 1301B is substantially similar to card 1301A shown in FIG. 14A, except that the additional pins P8-P13 can be used for complementary signals A+, A−, B+, B−, C+, and C−, as indicated in the pin assignment table, thereby providing three additional differential data channels (A+/A−, B+/B−, and C+C−). Note that to provide compatibility with conventional version 4.0 MMC devices, pins P8-P13 can be dual-use pins that provide clocked serial data signals DAT1-DAT7, respectively, during clocked data transfers.

Figure 14C:
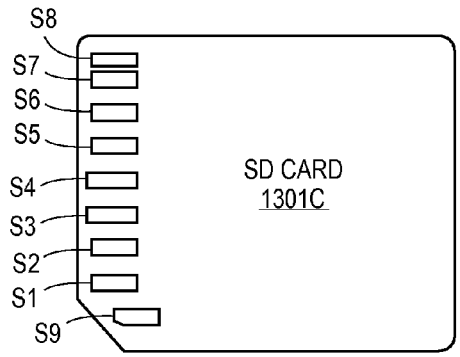

Note that similar modifications can be made to any other type of flash memory card without changing form factor or pin compatibility. For example, FIG. 14C shows a mechanical form factor diagram for an embodiment of a SD card 1301C that provides differential data transfer capabilities. A sample pin assignment for SD card 1301C is listed in Table 5, below.

TABLE 5

| Pin No. | Name |
| --- | --- |
| S1 | D−/DAT3 |
| S2 | CMD (OPT.) |
| S3 | VSS1 |
| S4 | VDD |
| S5 | CLK (OPT.) |
| S6 | VSS2 |
| S7 | D+/DAT0 |
| S8 | A+/DAT1 (OPT.) |
| S9 | A−/DAT2 (OPT.) |

Card 1301C includes pins S1-S9, of which pins P3, P4, and P6 are power supply pins for receiving supply voltages VSS1, VDD, and VSS2, respectively. Pins S1 and S7 can then be used to send/receive complementary signals D− and D+, respectively, which make up a differential signal for communications between SD card 1301C and a host device. In one embodiment, pins S8 and S9 could provide another differential data path for complementary signals A+ and A−, respectively. If card 1301C also includes a standard SD datapath (i.e., legacy datapath 1330L shown in FIG. 13A), card 1301C can receive a clock signal CLK at pin S5, while pins S7, S8, S9, and S1 can be used for clocked serial data signals DAT0, DAT1, DAT2, and DAT3, respectively (with pins S1 and S7 being dual-use pins).

Figure 14D:
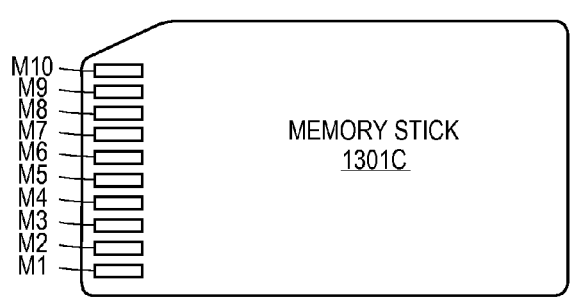

In another example, FIG. 14D shows a mechanical form factor diagram of an embodiment of a Memory Stick 1301D that provides differential data transfer capabilities. A sample pin assignment for Memory Stick 1301D is listed in Table 6, below.

TABLE 6

| Pin No. | Name |
| --- | --- |
| M1 | VSS |
| M2 | BS |
| M3 | D−/DAT1 |
| M4 | D+/DAT0 |
| M5 | A−/DAT2 |
| M6 | INS |
| M7 | A+/DAT3 |
| M8 | SCLK (OPT.) |
| M9 | VCC |
| M10 | VSS |

Figure 14E:
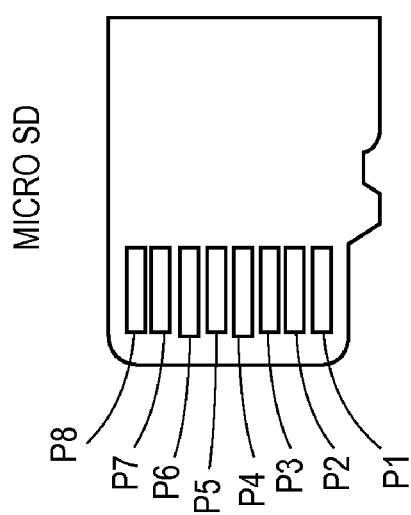

Memory stick 1301D includes pins M1-M10, of which pins M1, M9, and M10 are power supply pins for receiving supply voltages VSS, VCC, and VSS, respectively. Pins M2 and M6 are for bus state signals BS and insertion signals INS, respectively, that are required by the Memory Stick specification. Thus, pins M3 and M4 can be used for complementary data signals D− and D+, respectively, that make up a differential data signal for communications between Memory Stick 1301D and a host device. Optionally, pins M5 and M7 can provide another differential data communications channel for complementary data signals A− and A+, respectively. If Memory Stick 1301D includes a standard Memory Stick datapath (i.e., legacy datapath 1330L shown in FIG. 13A), Memory Stick 1301D can receive a clock signal SCLK at pin M8, while pins M4, M3, M5, and M7 can be used for clocked serial data signals DAT0, DAT1, DAT2, and DAT3, respectively (with pins M3, M4, and possibly M5 and M7 being dual-use pins). In another example, FIG. 14E shows a mechanical form factor diagram of an embodiment of a Micro-SD that provides differential data transfer capabilities.

Figure 15A:
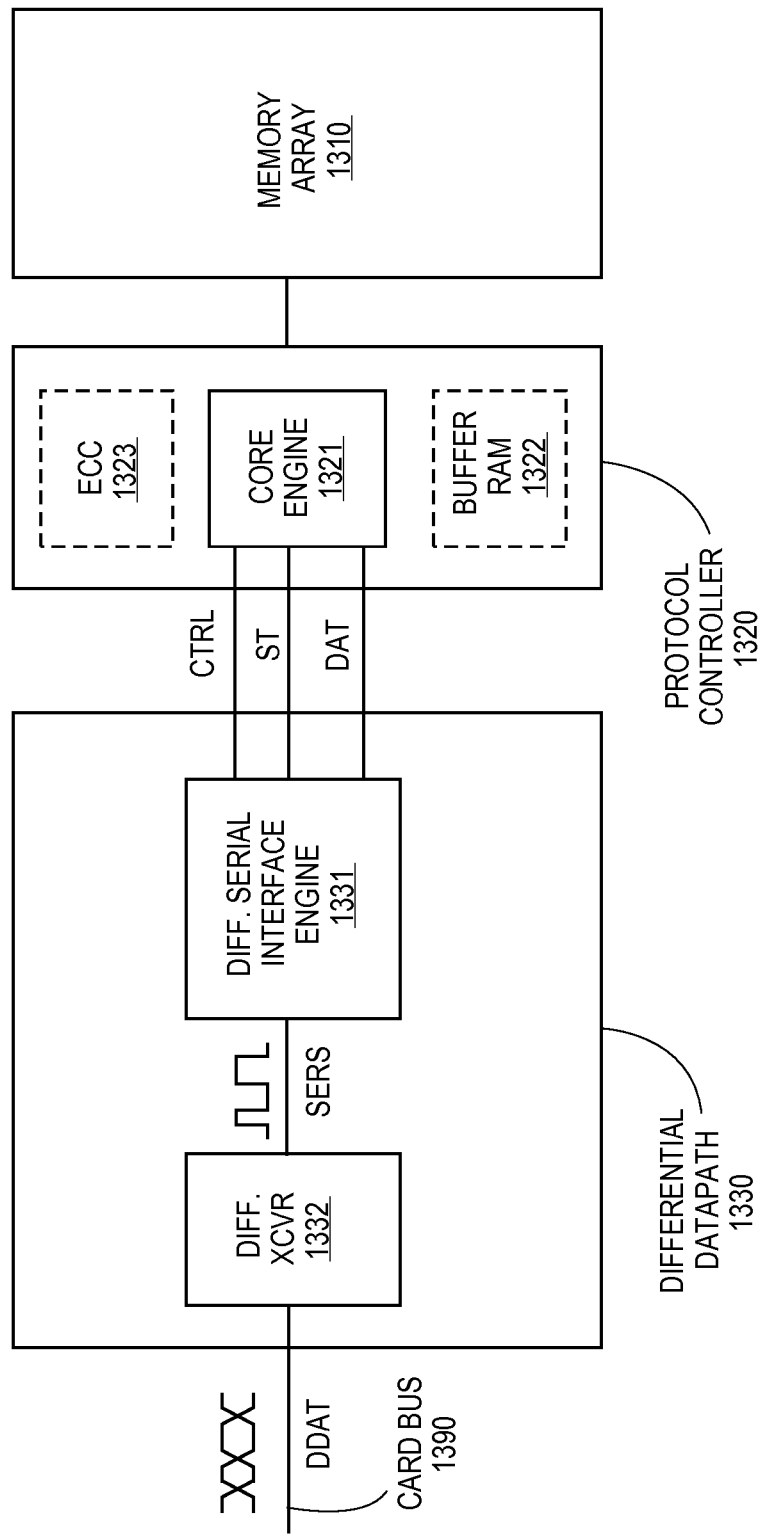
FIG. 15A is a schematic diagram of an embodiment of a differential data path for a flash memory card.

FIG. 15A shows a detailed embodiment of memory card 1301 shown in FIG. 13A. Protocol controller 1320 includes a core engine 1321, optional buffer RAM 1322, and an optional error checking circuit (ECC) 1323. Core engine 1321 controls memory array 1310 according to status signal ST and incoming data signal DAT, and generates control signal CTRL and outgoing data signal DAT (as described above with respect to FIG. 13A) in response. Buffer RAM 1322 can be included to buffer incoming and outgoing data signals DAT to compensate for slower memory access times in memory array 1310. Finally, ECC 1323 can be included in protocol controller 1320 to ensure that the signal integrity of signals CTRL, ST, and DAT are properly maintained.

In one embodiment, differential data path 1330 includes a differential serial interface engine 1331 and a differential transceiver 1332. Differential serial interface engine 1331 provides any encoding/decoding, serialization/deserialization, and packetization of signals CTRL, ST, and DAT required for proper differential signal transmission (described in greater detail below with respect to FIG. 16A). Differential serial interface engine 1331 generates/receives a "multipurpose" (data and/or command information) serial signal SERS that is converted by differential transceiver 1332 to/from differential data signal DDAT, thereby enabling differential data transfer between memory card 1301 and a differential data transfer-enabled host device.

Figure 15B:
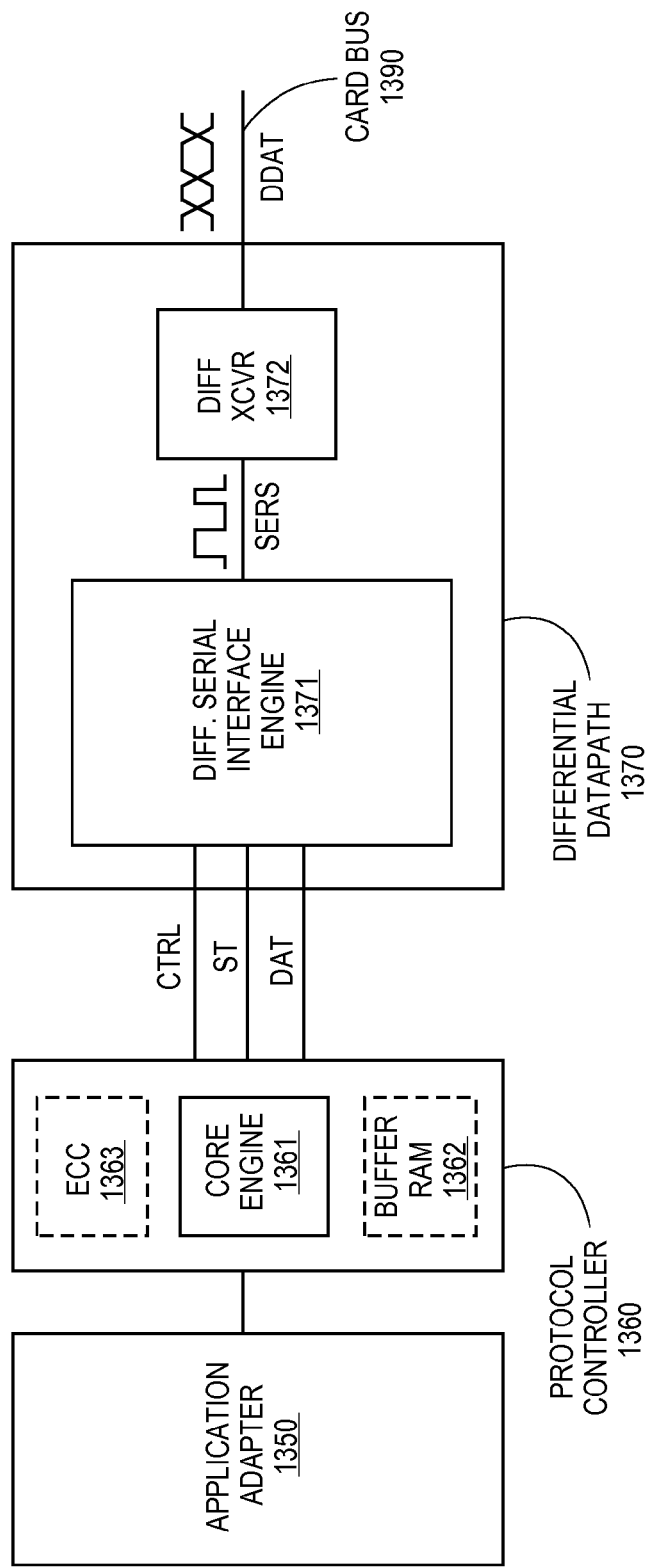
FIG. 15B is a schematic diagram of an embodiment of a differential data path for a host device.

FIG. 15B shows a detailed embodiment of host device 1302 shown in FIG. 13A that can interface with flash memory card 1301 shown in FIG. 15A. Protocol controller 1360 includes a core engine 1361, optional buffer RAM 1362, and an optional ECC 1363. In response to instructions from application adapter 1350, core engine 1361 generates appropriate outgoing control signals CTRL and data signals DAT, and processes incoming status signals ST and data signals DAT for application adapter 1350 (as described above with respect to FIG. 13A). Buffer RAM 1362 can be included to buffer incoming and outgoing data signals DAT to compensate for differences between the data bandwidth of data signal DAT and the data handling capabilities of application adapter 1350 (or the host device). Finally, ECC 1363 can be included in protocol controller 1360 to ensure that the signal integrity of signals CTRL, ST, and DAT are properly maintained.

Meanwhile, differential data path 1370 includes a differential serial interface engine 1371 and a differential transceiver 1372. Like differential serial interface engine 1331 in flash memory card 1301 (in FIG. 15A), differential serial interface engine 1371 provides any encoding/decoding, serialization/deserialization, and packetization of signals CTRL, ST, and DAT required for proper differential signal transmission (described in greater detail below with respect to FIG. 16B). Differential serial interface engine 1371 generates/receives a multipurpose serial signal SERS that is converted by differential transceiver 1372 to/from differential data signal DDAT, thereby enabling differential data transfer between host device 1302 and a differential data transfer-enabled flash memory card.

Figure 16:
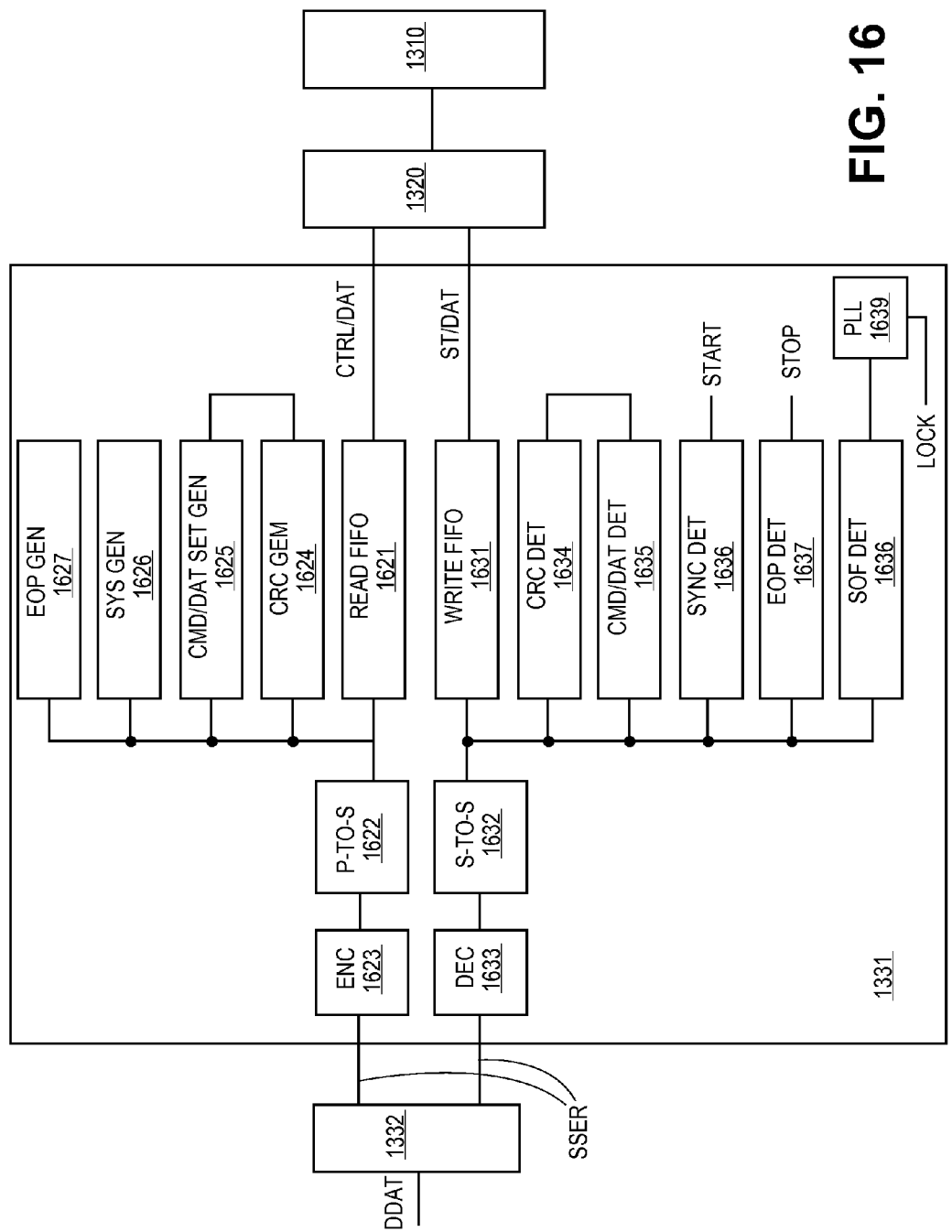
FIG. 16 is a detailed schematic diagram of an embodiment of a serial interface engine for use in generating (and decoding) serial differential data signals in a flash memory card.

FIG. 16 shows a detailed embodiment of serial interface engine 1331 shown in FIG. 15A. Serial interface engine 1331 includes a read FIFO (first-in-first-out memory) 1621, a parallel-to-serial converter 1622, an encoder 1623, a CRC generator 1624, a command/data set circuit 1625, a sync generator 1626, an EOP (end of packet) generator 1627, a write FIFO 1631, a serial-to-parallel converter 1632, a decoder 1633, a CRC detector 1634, a command/data detector 1635, a sync detector 1636, an EOP detector 1637, a SOF (start of frame) detector 1638, and a phase-locked-loop (PLL) 1639. Serial interface engine 1331 shown in FIG. 16A enables serial differential data transfer via data packetizing to eliminate the need for clocked data transfer. Note that the underlying card protocol (e.g., MMC protocol) may itself include some form of packetization, in which case SIE 1331 can simply perform its packetization over the underlying packetized data.

Decoder 1633 is coupled to receive serial signal SSER from differential transceiver 1332 and decodes the data according to a predetermined encoding protocol. For example, in one embodiment, NZRI (non-return to zero inverted) encoding can be used to enable the differential data transfer, while bit stuffing can be incorporated to facilitate frame detection. In such circumstances, decoder 1633 can include NRZI decoding and bit unstuffing logic. Decoder 1633 can also include clock recovery logic and an elastic store buffer to compensate for localized timing problems (e.g., jitter).

The decoded signal generated by decoder 1633 is parallelized by serial-to-parallel converter 1632 for more efficient processing. The data is then sent to write FIFO 1631, CRC detector 1634, command/data detector 1635, sync detector 1636, EOP detector 1637, and SOF detector 1638. Sync detector 1636 identifies synchronization fields in the incoming signals, and upon detection of a synchronization field, initiates packet reception by providing a signal START to write FIFO 1631, CRC detector 1634, command/data detector 1635, EOP detector 1637, and SOF detector 1638.

In response to signal START, write FIFO 1631 begins storing the contents of the incoming signal (from serial-to-parallel converter 1632), while CRC detector 1634 performs a CRC check on the incoming data. If different CRC formats are used for command and data signals (e.g., CRC7 for commands and CRC16 for data), command/data detector 1635 determines whether the incoming data blocks are command block or data blocks, and instructs CRC detector accordingly. Note that various error handling procedures can be performed if the CRC check fails, including terminating the process, or requesting re-transmission of the command/data.

Meanwhile, SOF detector 1638 detects the SOF fields in the incoming data and provides the resulting frame timing frequency to PLL 1639, which in turn generates a local clock signal LCLK in response (SOF fields are inserted at regular intervals into the incoming signal by the host device). As a result, local clock signal LCLK is synchronized with the original system clock in the host device used in the original encoding of the incoming signals and can be used as a recovery clock for the incoming signals.

Finally, when EOP detector 1637 detects an EOP field, EOP detector 1637 ends the packet reception by issuing a signal STOP to write FIFO 1631, CRC detector 1634, command/data detector 1635, EOP detector 1637, and SOF detector 1638. Protocol controller 1320 then reads the packet data (which can be either a status (ST) or data (DAT) signal) from write FIFO 1631, after which the next packet reception can begin. In this manner, write FIFO 1631, CRC detector 1634, command/data detector 1635, EOP detector 1637, and SOF detector 1638 can act as de-packetizing logic for serial interface engine 1331.

The control signal CTRL and/or data signal DAT returned by protocol controller 1320 is then stored into read FIFO 1621. Meanwhile, CRC generator 1624 and sync generator 1626 generate a CRC field and a synchronization field, respectively, for the outgoing signal. Note that command/data set circuit 1625 can provide an appropriate indicator to CRC generator 1624 if different CRC formats are used for command and data packets. The contents of read FIFO 1621 are then passed to parallel-to-serial converter 1622 for serialization, with EOP generator 1627 issuing an EOP field at the end of each packet. In this manner, read FIFO 1621, CRC generator 1624, command/data set circuit 1625, sync generator 1626, and EOP generator 1627 can act as packetizing logic for serial interface engine 1331.

Figure 17A:
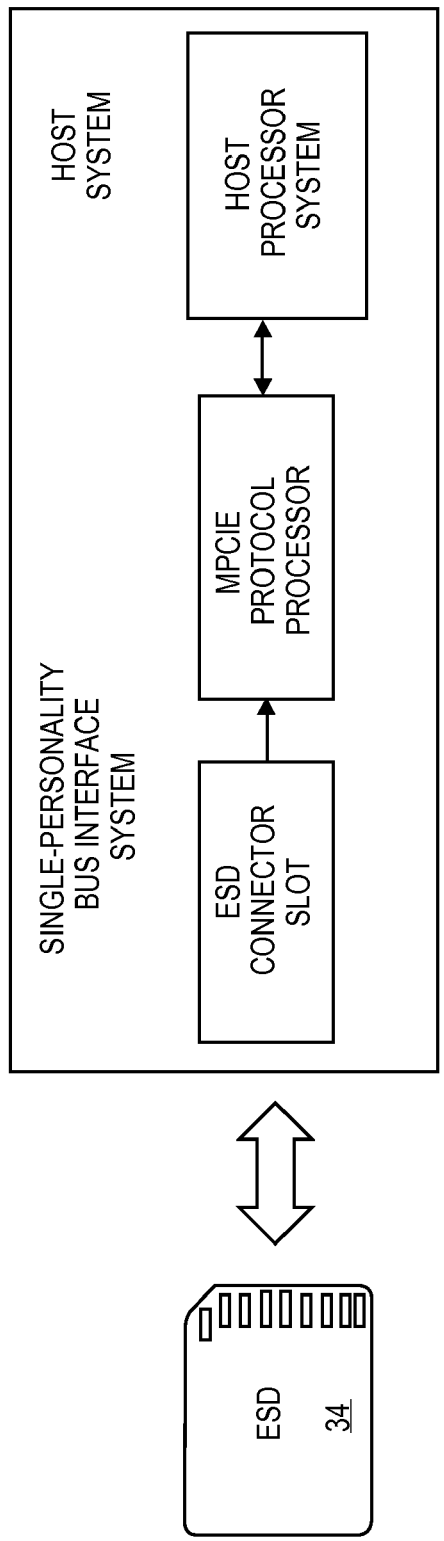
FIGS. 17A-17B are block diagrams illustrating various configurations of bus interface systems.
Figure 17B:
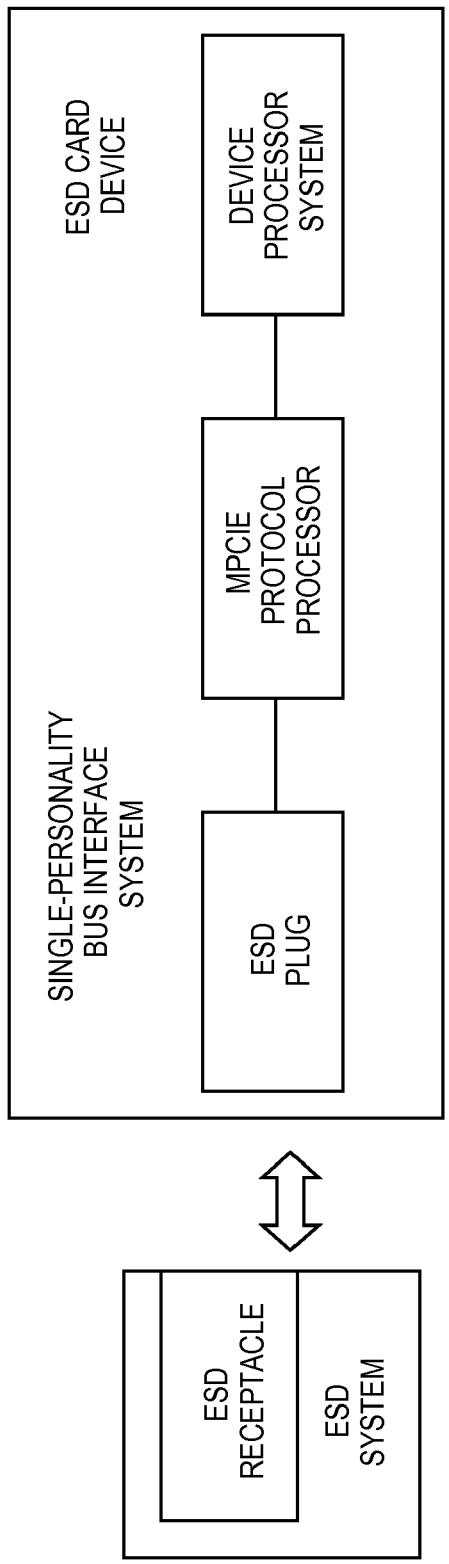

Parallel-to-serial converter 1622 then converts the incoming parallel data into a serial bitstream that is then encoded by encoder 1623. Just as described with respect to decoder 1633, encoder 1623 applies the predetermined encoding protocol to the bitstream from parallel-to-serial converter 1622 to generate an outgoing serial signal SSER, which is then converted to a differential data signal DDAT by differential transceiver 1332. For example, in one embodiment, encoder 1623 can include bit stuffing and NRZI encoding logic. FIGS. 17A-17B are block diagrams illustrating certain configurations of ESD system configurations which may be used with embodiments as described above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method communicating with a dual personality removable card interface, the method comprising:

detecting a removable card inserted into a dual-personality connector slot for connecting to a standard-protocol card and for connecting to an extended-protocol card, the dual-personality connector slot to accept the standard-protocol card and to accept the extended-protocol card, the dual-personality connector slot including standard metal contacts and extended metal contacts that both make contact with the standard-protocol card and both make contact with the extended-protocol card, wherein the removable card includes a multi-level cell (MLC) memory array;

applying power to the removable card via the standard protocol metal contacts;

interrogating the removable card to identify a type of the removable card in order to determine whether the removable card operates according to the extended protocol by sending one or more commands associated with the extended protocol to the removable card and examining a response from the removable card in view of the commands; and invoking a corresponding protocol processing logic corresponding to the extended protocol to handle further communications between a host and the removable card if the removable card is determined to be an extended protocol card, including enabling the host sending a request to the removable card for receiving a predetermined blocks of data from the removable card, in response to the request, the removable card replying with a positive acknowledgement (ACK) and sending a first block of data to the host, in response to the first block of data received from the removable card, enabling the host requesting a next block of data, if the removable card is not ready, the removable card replying with a negative acknowledgement (NACK) indicating that the removable card is not ready to send further data, in response to the NACK, enabling the host suspending requests for further data, subsequently when the removable card is ready, the removable card sending a ready signal (RDY) to the host indicating that the removable card is ready to send further data, and enabling the host replying an ACK to the removable card to receive further data until all of the predetermined blocks of data have been received.

2. The method of claim 1, further comprising:

enabling the host examining an error correction code (ECC) associated with a third block of data received from the removable card; and if the ECC is incorrect, enabling the host sending an NACK to the removable card requesting resending the third block of data from the removable card.

3. The method of claim 2, further comprising:

enabling the host suspending operations related to receiving data from the removable card in an attempt to wait for the third block of data to be resent;

enabling the host periodically determining whether the suspension has exceeded a predetermined period of time; and enabling the host aborting the operations to receiving further data from the removable card if the suspension has exceeded the predetermined period of time.

4. The method of claim 3, further comprising enabling the host retrying receiving the third block of data from the removable card if the suspension has not exceeded the predetermined period of time.

5. The method of claim 1, further comprising one of the mechanical form factors, including at least one of Secure-Digital, Multi-media Card, Micro Secure-Digital, or Memory Stick card.

6. A computer-implemented method communicating with a single personality removable card interface, the method comprising:

detecting a removable card inserted into a single-personality connector slot for connecting to a standard-protocol card and for connecting to an extended-protocol card, the single-personality connector slot to accept the standard-protocol card and to accept the extended-protocol card, the single-personality connector slot including standard metal contacts and extended metal contacts that both make contact with the standard-protocol card and both make contact with the extended-protocol card, wherein the removable card includes a multi-level cell (MLC) memory array;

applying power to the removable card via the standard protocol metal contacts;

interrogating the removable card to identify a type of the removable card in order to determine whether the removable card operates according to the extended protocol by sending one or more commands associated with the extended protocol to the removable card and examining a response from the removable card in view of the commands; and invoking a corresponding protocol processing logic corresponding to the extended protocol to handle further communications between a host and the removable card if the removable card is determined to be an extended protocol card, including enabling the host sending a request to the removable card for sending a predetermined blocks of data to the removable card, enabling the host starting sending a first block of data to the removable card, the removable card replying with a positive acknowledgement (ACK) to the host, indicating that the first block of data has been successfully received, in response to the ACK, enabling the host sending a second block of data to the removable card, if a receiving buffer is full, the removable card sending a negative acknowledgement (NACK) to the host indicating that the removable card is not ready to receive further data, in response to the NACK, enabling the host suspending sending further data to the removable card, subsequently when the removable card is ready to receive further data from the host, the removable card sending a ready (RDY) signal to the host, and in response to the RDY signal, enabling the host sending further data to the removable card until all of the predetermined blocks of data have been sent to the removable card.

7. The method of claim 6, further comprising:

the removable card examining an error correction code (ECC) associated with a third block of data received from the removable card; and if the ECC is incorrect, the removable card sending an NACK to the host requesting resending the third block of data from the host.

8. The method of claim 7, further comprising:

enabling the host resending the third block of data;

enabling the host periodically determining whether time to sending the third block of data has exceeded a predetermined period of time; and enabling the host aborting the operations to sending further data to the removable card if the suspension has exceeded the predetermined period of time.

9. The method of claim 8, further comprising enabling the host retrying sending the third block of data to the removable card if the suspension has not exceeded the predetermined period of time.

10. The method of claim 6, further comprising one of the mechanical form factors, including at least one of Secure-Digital, Multi-media Card, Micro Secure-Digital, or Memory Stick card.

\* \* \* \* \*